(12) United States Patent
Cleron et al.

(10) Patent No.: US 8,266,550 B1
(45) Date of Patent: Sep. 11, 2012

(54) PARALLAX PANNING OF MOBILE DEVICE DESKTOP

(75) Inventors: Michael A. Cleron, Menlo Park, CA (US); Romain P. Guy, San Francisco, CA (US); Martin Chakirov, Trelleborg (SE)

(73) Assignee: Google Inc., Mountain View, CA (US)

( * ) Notice: Subject to any disclaimer, the term of this patent is extended or adjusted under 35 U.S.C. 154(b) by 434 days.

(21) Appl. No.: 12/474,238

(22) Filed: May 28, 2009

Related U.S. Application Data

(60) Provisional application No. 61/056,825, filed on May 28, 2008.

(51) Int. Cl.
*G06F 3/033* (2006.01)
*G06F 3/048* (2006.01)
*G06F 3/14* (2006.01)

(52) U.S. Cl. ........ 715/863; 715/778; 715/784; 715/864; 345/173

(58) Field of Classification Search .................. 715/828, 715/847, 863, 778, 784, 864; 345/173
See application file for complete search history.

(56) References Cited

U.S. PATENT DOCUMENTS

| 5,923,307 A | * | 7/1999 | Hogle, IV | 345/4 |
| 2007/0079246 A1 | * | 4/2007 | Morillon et al. | 715/741 |
| 2009/0064055 A1 | * | 3/2009 | Chaudhri et al. | 715/863 |

OTHER PUBLICATIONS

Berners-Lee, T., Request for Comments: 1630—Universal Resource Identifiers in WWW: A Unifying Syntax for the Expression of Names and Addresses of Objects on the Network as used in the World-Wide Web, Jun. 1994, CERN.*
Carter, Chad, Microsoft® XNA™ Unleashed: Graphics and Game Programming for Xbox 360 and Windows, Jul. 26, 2007, Sams, pp. 220-230.*
Wyatt, Paul, The Art of Parallax Scrolling, Aug. 2007, pp. 74-76 retrieved via Internet at http://mos.futurenet.com/pdf/net/NET165_tut_flash.pdf on Nov. 18, 2011.*

* cited by examiner

*Primary Examiner* — Kieu Vu
*Assistant Examiner* — James T Durkin
(74) *Attorney, Agent, or Firm* — Fish & Richardson P.C.

(57) ABSTRACT

A computer-implemented user interface method includes displaying on a mobile device desktop a background image and one or more foreground items over the background image, receiving a user input to pan across the desktop, and panning the background images and one or more foreground images in a parallax manner relative to each other.

36 Claims, 17 Drawing Sheets

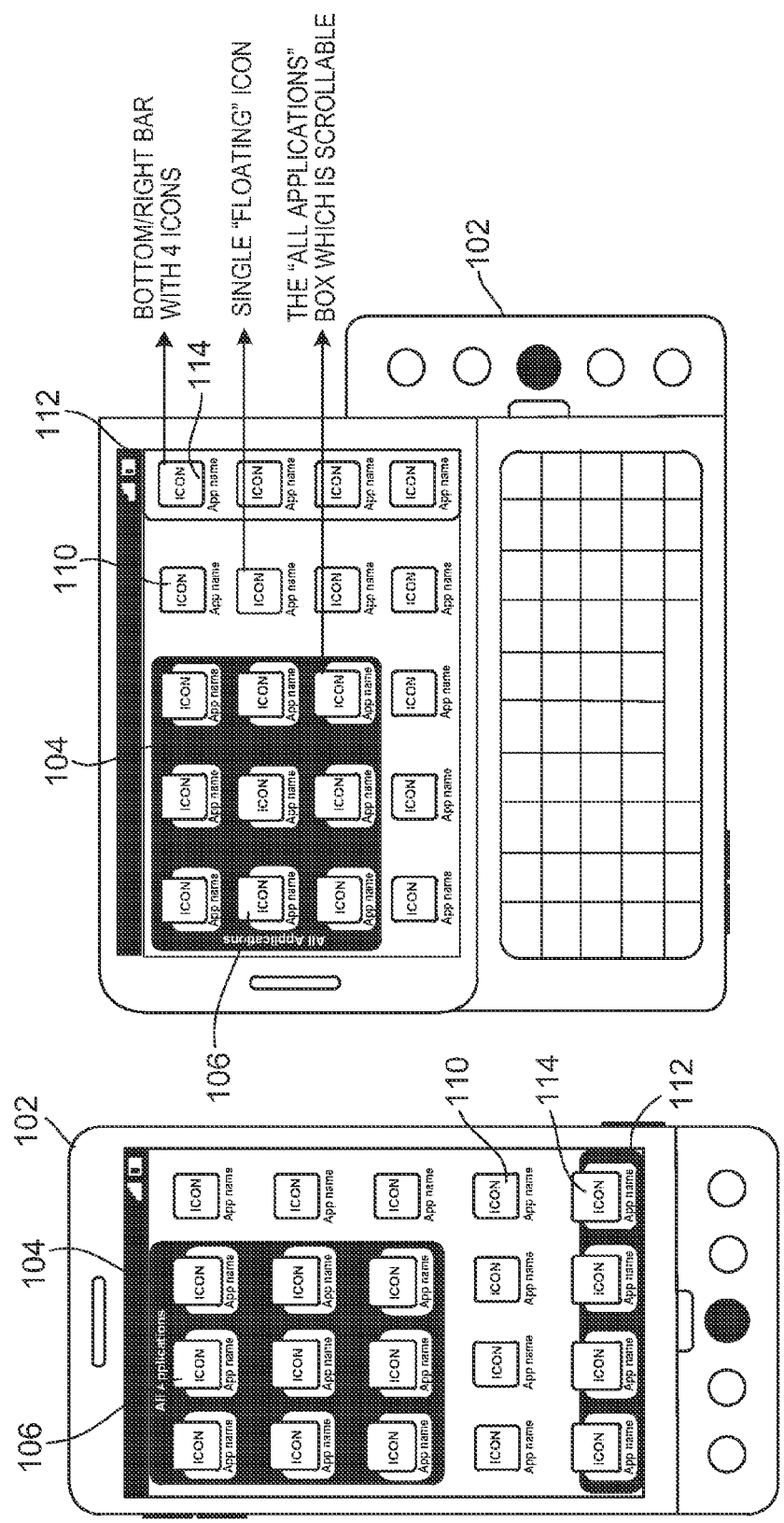

PARALLAX PANNING OF MOBILE DEVICE DESKTOP

CLAIM OF PRIORITY

This application claims the benefit under 35 USC §119(e) of U.S. Provisional Patent Application Ser. No. 61/056,825, filed on May 28, 2008, the entire contents of which are hereby incorporated by reference.

TECHNICAL FIELD

This document relates to systems and techniques for organizing elements on a computer desktop and for executing actions associated with such elements.

BACKGROUND

People spends hours at a time with their electronic devices—computers, telephones, music players, and the like. They like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, 4-directional keypads (e.g., d pads), and other such input mechanisms.

Fine distinctions in user interfaces can make a world of difference in a user's experience with a device. Intuitive user interface interactions may be at a premium for mobile devices, where display sizes are generally limited, as are input mechanisms (e.g., full size keyboards may be hard to implement because of space constraints, or may be hard to use when a user cannot easily use both hands with their computing device).

SUMMARY

This document describes systems and techniques that may be employed by someone who wants to interact with applications on a computing device like a mobile telephone that has a touch screen user interface, and perhaps other input mechanisms such as trackballs. In general, the techniques relate to a desktop interface for an operating system of such a device. The desktop may generally be a "home" location for an operating system, and can include a number of selectable icons that, when selected, cause certain defined actions to be performed. For example, when an icon for a software application is selected, the application may be launched, and when an icon for a certain type of document is selected, a software application associated with the document may be launched with the document opened in the application.

In certain examples shown here, the types of actions that may be associated with desktop icons may be increased dramatically by associating each icon with a Universal Resource Identifier (i.e. URI) in the system that points to a particular operating system object. Such objects can include executable applications, database records such as a contact of the user, files, persistent searches (e.g., searches having multiple terms and connectors that are saved over time so that a user need not enter the search over and over), and other such targets.

Consistent with this idea of treating various display elements on a desktop in similar manners, each of the various types of graphical elements may be assigned to a single layer on the desktop. For example, icons for shortcuts, and gadgets or widgets, may all be on the same layer. Objects that share a common layer are treated as being part of a common group by the operating system rather than as being a subset of one particular layer. In addition, for this reason, objects on a single layer are treated similarly for display purposes, and they may thus not be allowed to overlap visually with each other on a display (at least not fully overlap).

The desktop may span across multiple screens of the mobile device so as to provide additional space for placing desktop elements where the display is small. A user may move back and forth between the different displays, and may drag elements from one display to another. The desktop may also include a background that holds a wallpaper image, in a familiar and known manner. The background may stretch across all of the multiple displays so as to give the user an visual baseline so that they more readily understand which display they are currently viewing—i.e., they understand their positional context on the multi-screen desktop. When a user pans from one display to another, the wallpaper or background may move at a rate that is slower that elements on the desktop in the foreground, such as icons, move, so as to provide a three-dimensional parallax effect to the panning effort.

In addition, the manner in which user feedback is provided on the device screen in response to user inputs may vary depending on the type of mechanism that the user has employed to provide the input. Such changes may occur automatically and in the middle of the user's use of the different mechanisms. For example, when a user employs a pointer input, which is a device such as a joystick or trackball that is separate from the display but permits control of an object such as an arrow or other pointer on the screen, selections of elements on the screen may be indicated by highlighting the objects and snapping from one object to the next. If a user then switches to providing input to the touch screen (e.g., by pressing a finger to the screen and moving it), the previous highlighting can be removed and replaced by feedback that relates to the touch input, such as by highlighting other elements on the desktop that were touched and dragged across, or by drawing a window around such objects. Such a transition may occur automatically, by the system recognizing a change in active input mechanism.

In certain implementations, such systems and technique may provide one or more advantages. For example, with multiple screens that interact in these manners, a user may be provided with a relatively large number of icons or similar objects on a desktop without having to shrink each object until it can no longer be seen on a small screen. Also, a user may easily customize their desktop so that objects that are most important to them can be reached quickly and intuitively. The reactions of a system to a user may also be natural, including reaction when the user moves from one input mechanism to another. In addition, gadgets or widgets may be created and accessed more readily, and may be integrated with a user's desktop to provide a highly customizable experience. Each of these features may be provided in a visually pleasing manner, and in a way that can incorporate both touch screen and pointer (e.g., trackball) input.

In one implementation, a computer-implemented user interface method is disclosed. The method comprises displaying on a mobile device desktop a background image and one or more foreground items over the background image, receiving a user input to pan across the desktop, and panning the background images and one or more foreground images in a parallax manner relative to each other. The foreground items may be panned at a rate approximately 150% of the rate at which the background is panned. The method can also include panning to automatic snap points on a multi-screen desktop, and displaying foreground items from a screen that is adjacent to a screen on which the user input to pan is received. Moreover, the user input to pan can be received in the form of a finger flick on a touch screen input mechanism.

In another implementation, a computer-implemented user interface method comprises displaying on a computer desktop one or more program modules, and displaying on the computer desktop one or more icons that, when selected by a user, cause the execution of objects stored on the computer. The one or more program modules are displayed on a same layer of the desktop as are the one or more icons. In addition, the one or more icons may each include references to URIs, and selection of an icon may cause the device to be pointed to a URI associated with the icon.

The details of one or more embodiments are set forth in the accompanying drawings and the description below. Other features and advantages will be apparent from the description and drawings, and from the claims.

DESCRIPTION OF DRAWINGS

FIG. 1A shows portrait and landscape displays of a mobile device desktop.

Like reference symbols in the various drawings indicate like elements.

DETAILED DESCRIPTION

Figure 1B:
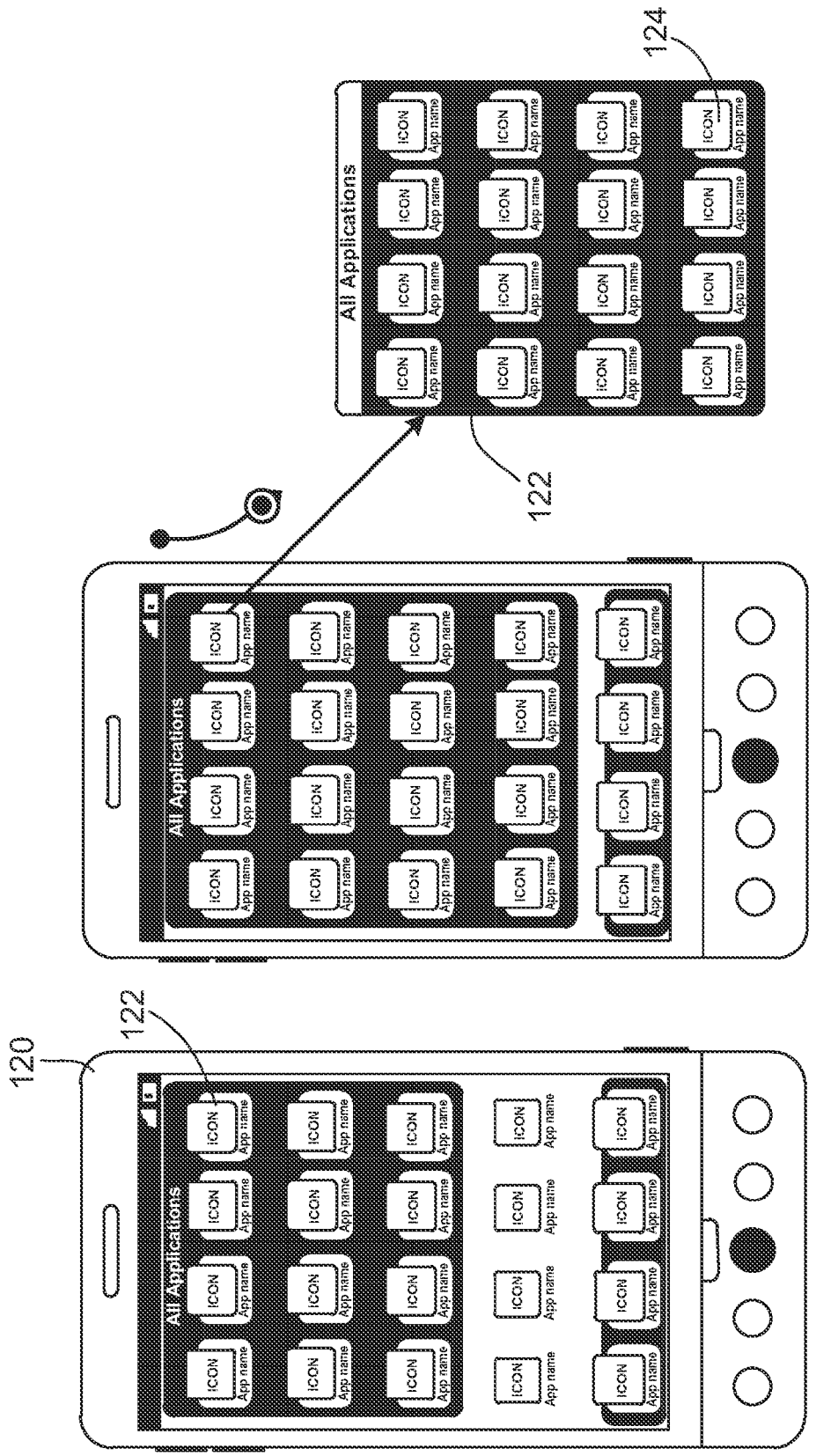
FIG. 1B shows a progression of displays for a mobile device desktop.

This document describes systems and techniques by which mobile devices may interact with users of such devices. In particular, interaction with elements on a computer desktop are described here, such as the creation of, arrangement of, display of, and interaction with, icons on a computer desktop. In addition, navigation around a computer desktop is also described, as are other related features for a computing device such as a mobile smart phone.

FIG. 1 shows portrait and landscape displays of a mobile device desktop. In the figure, a mobile device 102 is shown as displaying a number of icons, such as icon 110 on a computer desktop in a typical and familiar manner. The icons here have been genericized, and the generic information would, in normal circumstances, be replaced by an actual name of an application associated with an icon, and a computer graphic to represent the icon readily to a user of the device 102.

Although shown as icons for computer applications, the icons, such as icon 110, may be associated with a wide variety of computing objects, as described more fully below. For example, an icon could point to a folder of files, to a file, to a music source, to a contact in a contact list of a user, to a persistent query that, when it is activated, sends a predetermined query string to a remote search engine, or to any other appropriate operating system object.

An applications area 104 is defined on the computer desktop. The applications area 104 includes an icon for every computer application that is currently installed on the device 102 (or at least a sub-set of the installed applications). The applications area 104 thus serves as a place to which a user may turn when attempting to launch an application or when determining whether an application is available on a device 102. Nine icons in the application area 104, such as icon 106, are displayed in a manner similar to that for icons outside the application area 104, and may be interacted with in a similar manner. For example, as is well-known, a user's selection of an icon associated with a computer application, such as by the user clicking or tapping on the icon, may cause the computer application associated with the icon to be launched and made active on the device 102.

Certain icons, such as icon 114, are displayed in a bottom bar 112. The icons in the bottom bar 112 may be interacted with in a manner similar to other icons (e.g., clicking on them may cause their associated applications or other objects to launch), but they are generally made always available in the bottom bar 112, regardless of where the user is otherwise positioned on the desktop. For example, as will be shown further below, the desktop may have multiple screens or displays that are not currently visible to a user, and the user may pan back and forth between those multiple screens. Icons such as icon 110 may thus become hidden from immediate view when the user pans to a different display. However, icons, such as icon 114, in the bottom bar 112 will remain anchored at the bottom of the display even when the user pans.

The two devices shown in FIG. 1A represent a single device that is transformed between portrait presentation mode and landscape mode at a point in time. Such a transformation may occur automatically, for example, when a users slides open a slider telephone so as to indicate an intent to use it in landscape mode, using the device keyboard. One such change in displays from portrait to landscape mode includes a transformation of the bottom bar 112 into a sidebar. Such a transformation occurs so as to maintain the bar 112 along a short side of the display, and to thus avoid altering the overall layout of the display. For example, as shown, there is space for the bar 112 to show four icons along the short side of the display. By moving the position of the bar 112, the same four icons may generally be displayed in the other mode also.

In addition, the display of icons such as icon 114 relative to bar 112 has changed slightly between the two modes. For example, in portrait mode, the icons extend upward onto the desktop slightly from bar 112 so as to provide a form of three-dimensional effect of the icons floating over the bar 112. In landscape mode, the icons are shown wholly inside the bar 112, or could alternatively be shown having their left edges hanging over the edge of the bar 112.

The display of the applications area 104 also changes slightly when the device is transformed from portrait mode to landscape mode. In particular, the title bar 106 for the applications area 104 may be moved from the top of the area 104 to the side of the area 104. Again, such movement helps ensure that the area 104 does not become overly compressed along the shortest dimension of the display, by moving the title bar 106 into the longer dimension of the display at all times, where there is ample room for it.

Two points about the general layout of the icons on the desktop when transforming from portrait mode to landscape mode are notable here. First, the icons are redistributed evenly across the space so as to fill up the appropriate dimensions. As a result, for example, there may be added room for icon names in landscape mode, so that the application name for each icon may need to take two lines in portrait mode, but may expand to fill only a single line in landscape mode, as additional horizontal space is allocated to each icon. Second, the icons are not simply rotated on their own individual axes during the transformation from one mode to another in this example. If they were, the applications area 104 would be located in the lower left corner of the display in landscape mode after being converted from the portrait mode. Instead, the relative positioning of the icons on the desktop, apart from the icons in bar 112, is maintained between the modes. Thus, for example, the applications area 104 remains in the upper left corner of the display in both modes, with the main desktop items wrapped around it in a similar manner, and the spacing is simply readjusted.

Figure 2A:
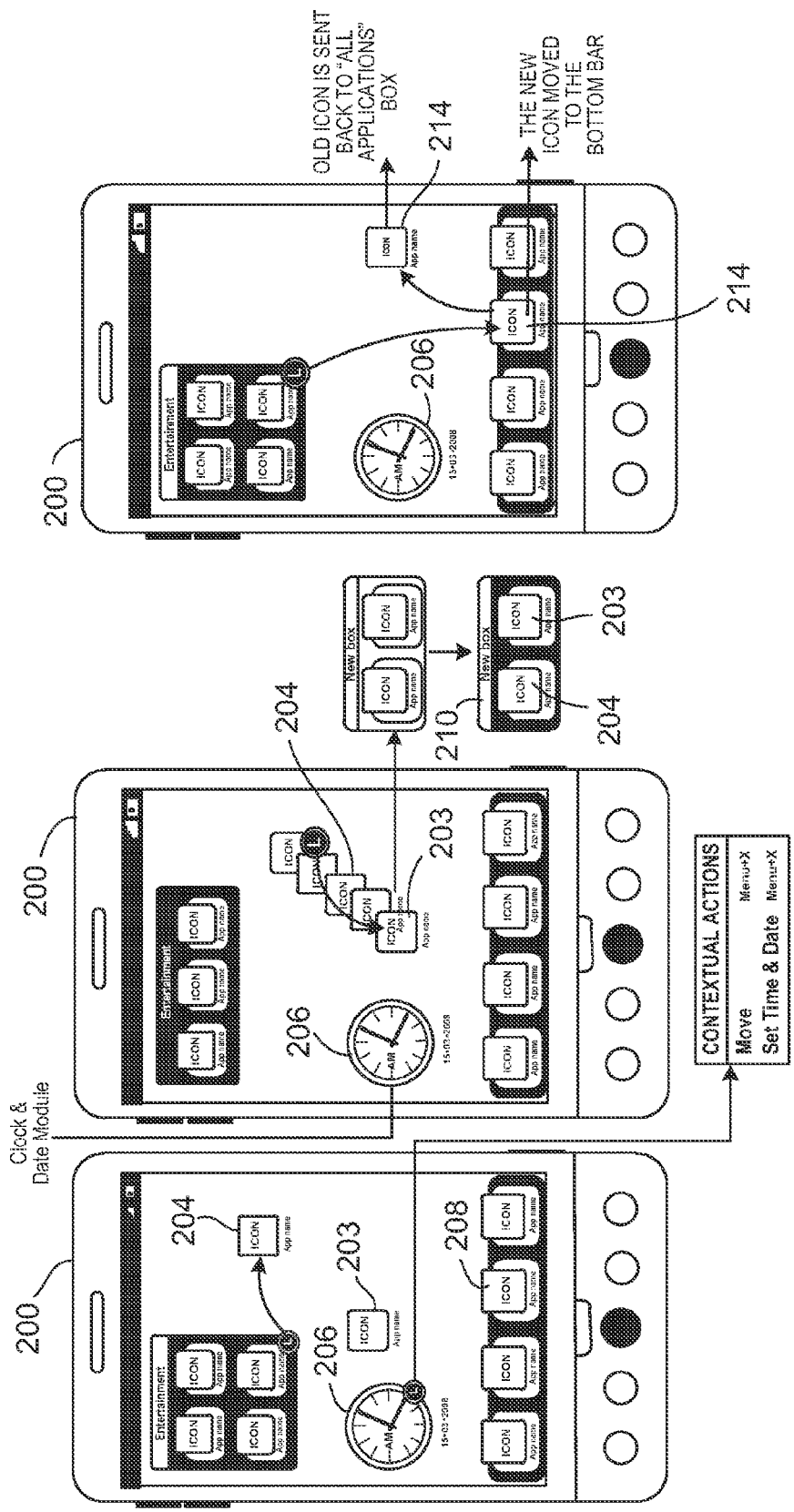
FIGS. 2A and 2B show manipulation of graphical elements on a mobile device display.
Figure 2B:
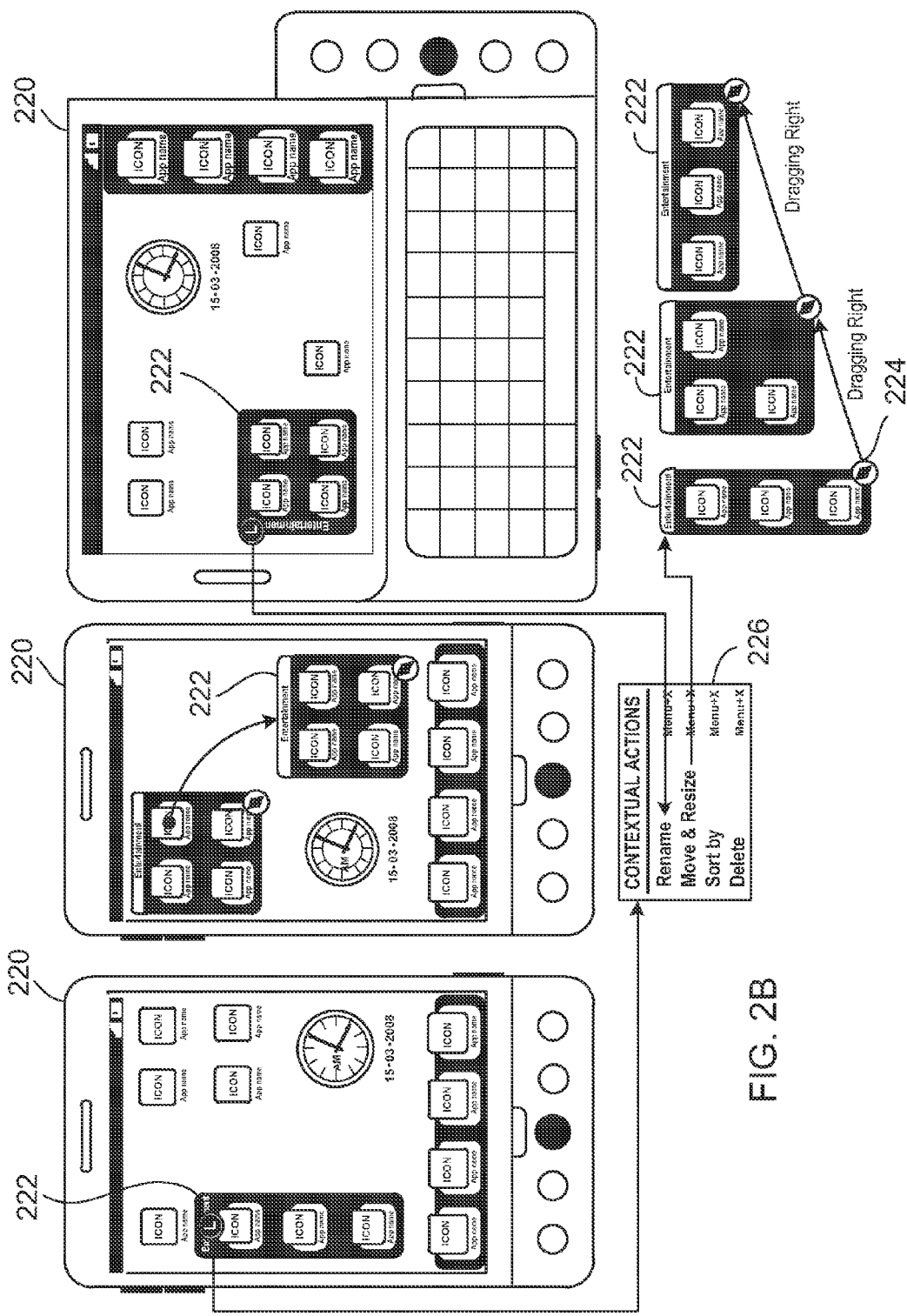
Figure 2C:
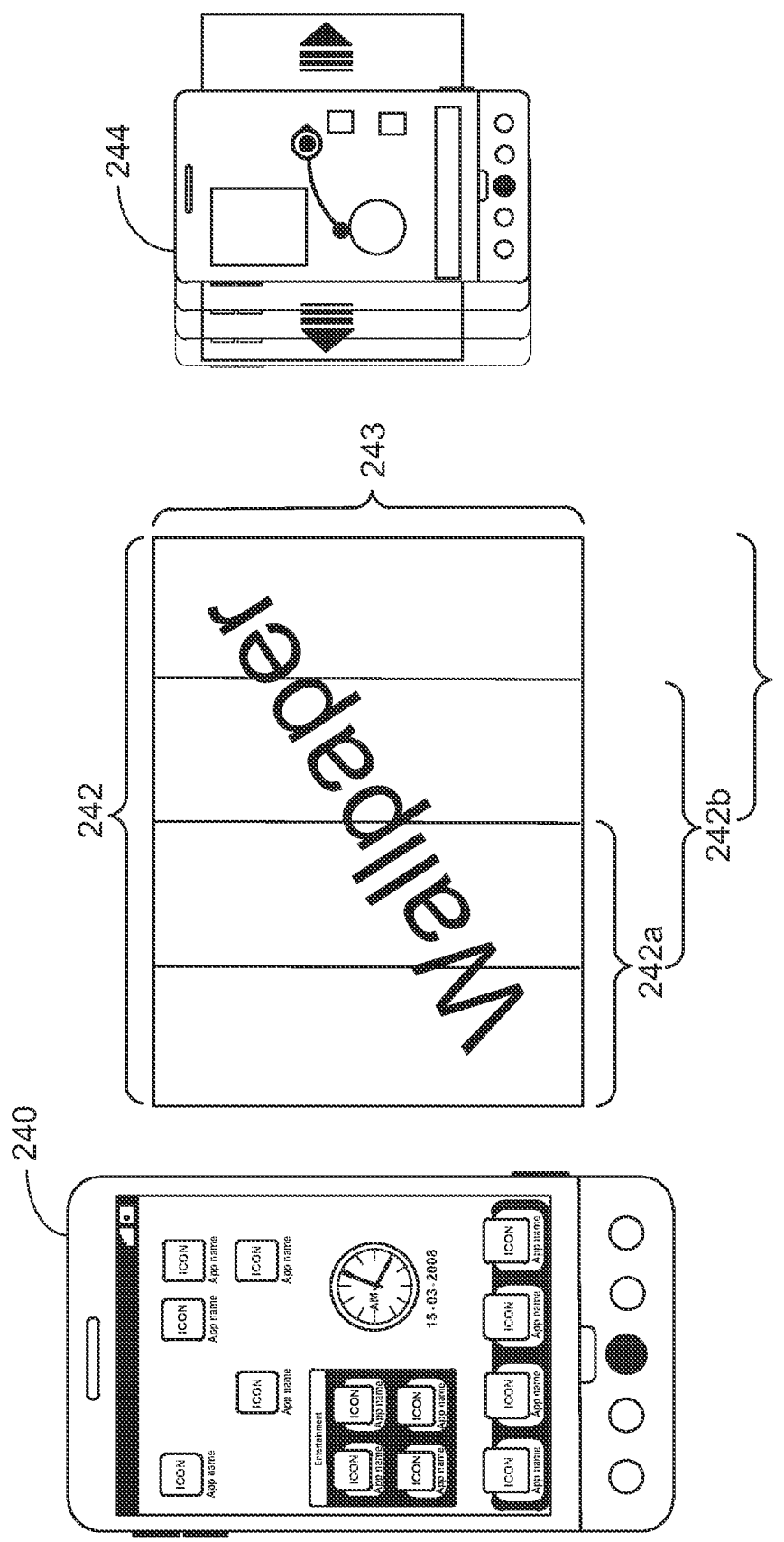
FIGS. 2C and 2D show schematically techniques for panning across a desktop space.
Figure 2D:
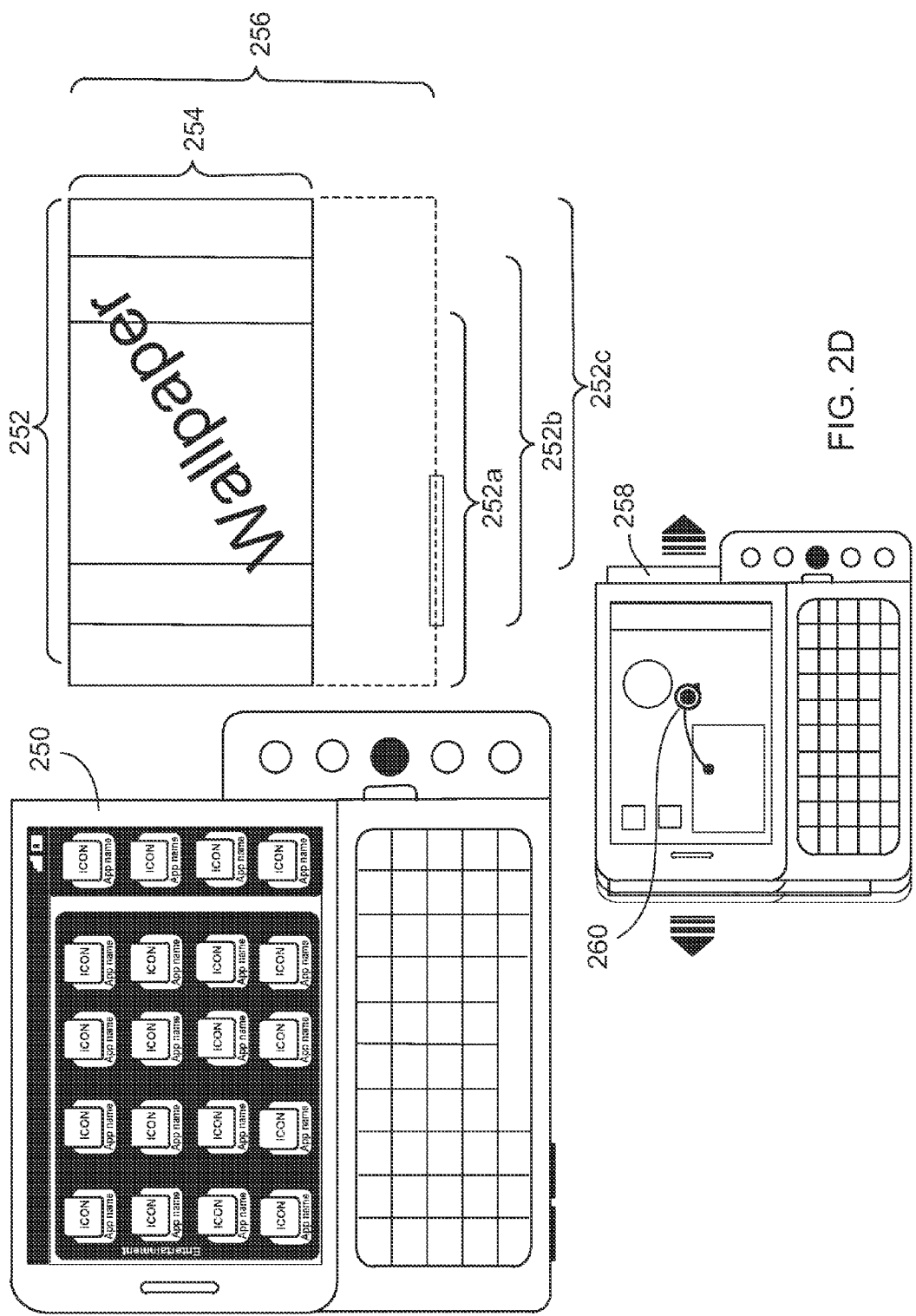
Figure 2E:
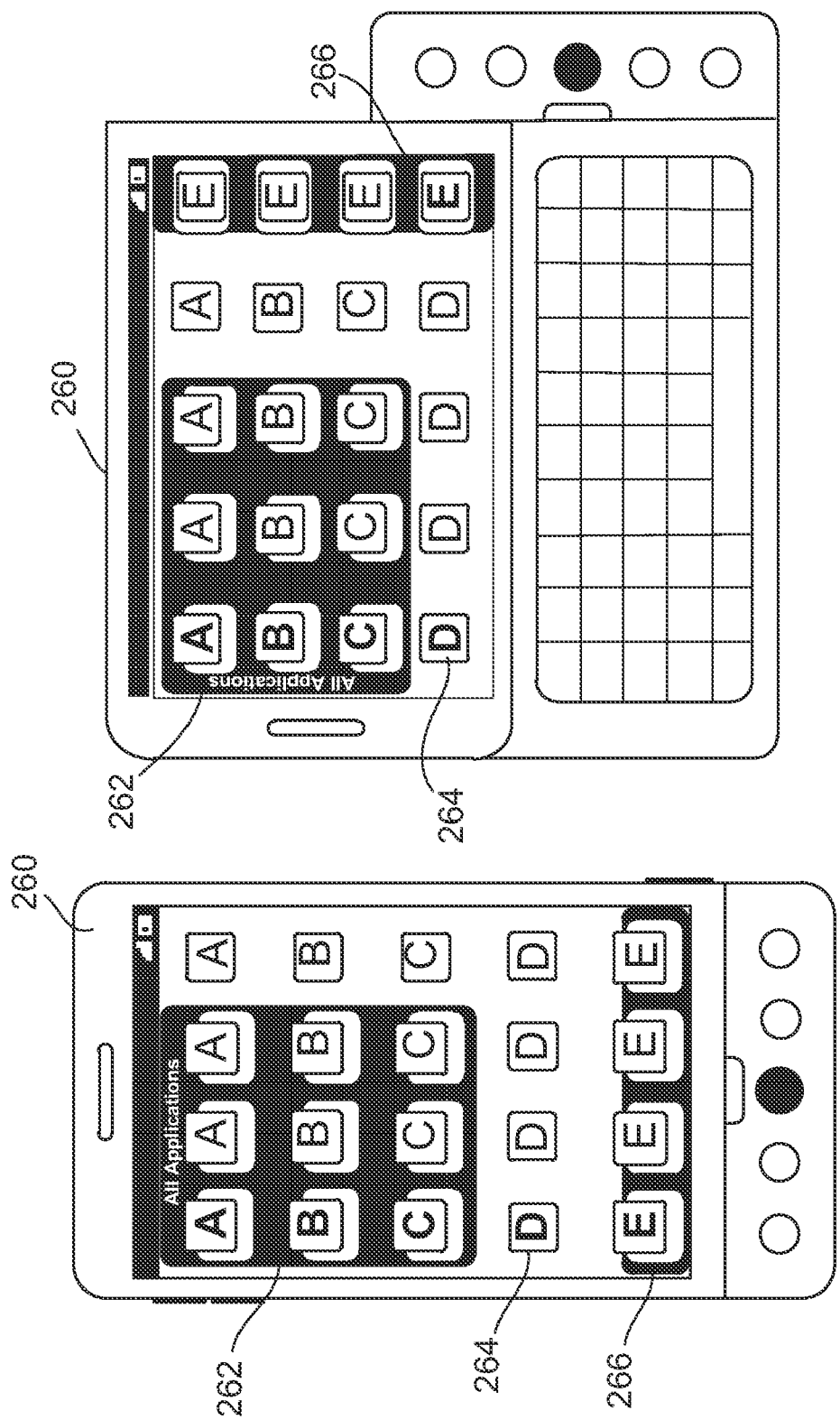
FIG. 2E shows portrait and landscape displays for arranging desktop icons.

The particular arrangement of icons between portrait mode and landscape mode can be seen even more clearly at FIG. 2E. In this figure, various icons are lettered so as to better demonstrate the relative positioning of icons in portrait mode versus landscape mode. As shown, a device 260 is initially in a portrait mode arranged similarly to the layout shown in FIG. 1A. In the transformation from portrait mode to landscape mode, an applications area 262 is widened and shortened, and the icons in the application area 262 are redistributed across the changed area 262, but the orientation and arrangement of the icons relative to each other does not change. Likewise, an icon on the main desktop, such as icon 264, remains in its initial location, in the lower left corner of the main desktop. An icon 266 in a bottom bar changes its position so that the bottom bar becomes a sidebar, but the icon 266 maintains its position relative to other icons in the bar, moving from the leftmost position in portrait mode to the bottommost position in landscape mode.

Also, in this example, the icons are snapped to discrete positions on the desktop, where there is no, or minimal, overlap between adjacent icons. Thus, as shown below, a user may move an icon freely around the desktop and may be given the impression that the icon may occupy an infinite number of locations on the desktop, but the icon may be smoothly snapped to a centerpoint of one of the locations when the user releases it. Alternatively, the icons may be permitted to be placed without regard to snapping to a particular grid, though such an arrangement may result in a messy appearance for the desktop.

FIG. 1B shows a progression of displays for a mobile device desktop. The example shown in the figures demonstrates interaction with icons in an applications area 122. The application area 122 may be less than the entire displayed desktop in size, and its size and/or shaped may be changed by a user, to show more or fewer of the items that are in the application area 122. In particular, the application area 122 may have its dimensions changed by a user, as discussed below, such as by the user dragging on a corner of the application area 122 to expand or contract it. As a result, it may not be possible for the application area 122 to display icons for all available applications at the same time. In such a situation, certain icons may be hidden off the edge of the application area 122, and a user may pan within the application area 122 itself. In one example, the size of the application area 122 may be bounded between a 1×2 area or 2×1 area at the smallest and a 4×4 area at the largest.

In the leftmost display, the application area 122 has a 4×3 size, while in the middle display, it has a 4×4 size and thus occupies all the space of the currently displayed bare desktop on the screen. When the area 122 is expanded, additional icons that were previously hidden outside the edge of the area 122 (i.e., off the bottom) may be displayed, much like additional icons are traditionally shown when a window is enlarged. The leftmost display may represent a default middle screen for a desktop that is displayed when a device is first activated, as it shows to a user all of the three different forms of icons available in this example: icons on the bare desktop itself, icons in a sub-area of the desktop (e.g., in a box), and icons in the bottom bar. When the applications area 122 is expanded, the icons on the desktop itself may be covered and hidden by the application area 122 or may be pushed onto adjacent displays that a user may reach by swiping sideways across the desktop.

The rightmost display in FIG. 1B shows the result of a user scrolling within the application area 122. In particular, a user can touch or flick-scroll down the application area 122 by touching at a low portion of the area 122 and flicking their finger upward while releasing it from the screen. Such a move will seem to transfer momentum to the icons and result in them scrolling upward at a rate generally proportional to the speed with which the user flicked. As the icons moved upward, the user scrolls downward through the icons.

The particular positioning of the user within the area 122 of icons that cannot all be displayed at one time, can be seen in this example by two interface elements. First, in the middle screen, the lowest icons in the area 122 are faded to black at their bottom edges, whereas in the rightmost screen, the highest icons are faded to black along their upper edges. Such a feature indicates to a user that there are additional items below or above the display, respectively, by simulating a wheel covered with icons that disappears into the darkness. Second, a scroll button 124 or scroll handle is displayed at the right edge of the rightmost display. The scroll button 124 may appear whenever the contents of an area are larger than the area itself, or may be displayed momentarily when the user flicks within an area to scroll. The user may then "grab" the button 124 to scroll up and down in a familiar manner.

FIGS. 2A and 2B show manipulation of graphical elements on a mobile device display. In general, the figures show the manner in which icons and program modules such as gadgets or widgets may be moved around a desktop surface. The example here focuses on the interaction of an application area 202, a program module 206, and several icons 203, 204, 208, across three different versions of the same mobile device display.

In the leftmost display, a mobile device 200 shows a 2×2 application area 202 that contains four icons. The four icons may represent all of the applications that are currently loaded and available for execution on the device 200. A user selection of any of the icons, such as by tapping on a touch screen over the appropriate icon or moving a pointer to the area with a pointing device, such as a trackball, and clicking with the pointing device, may cause the underlying application to launch. In this example, however, a user has long-pressed on the lower right icon to select it (but has not released their finger yet), and then dragged the icon 204 out of the application area 202 and onto the main desktop.

Such selection by the user may be accompanied by various feedback mechanisms to the user. For example, when the user has long pressed for a sufficient time in order to register a selection of the icon 204, the icon may increase slightly in size (e.g., by 10-30 percent) to make it look like the item is closer and has thus been picked up by the user, may change colors such as a by having its colors invert, or may be increased slightly in brightness, to indicate to the user visually that the icon is ready to be moved or otherwise manipulated. The size or other highlighting of the object may then be removed after the user has moved and release the object, so that the object returns to being a normal size as part of the desktop.

Such feedback may shift if a user changes the input mechanism that they are using in order to interact with the display. For instance, a user may initially navigate around the display using a pointer device such as a trackball. Because such interaction does not have a direct connection between a position of the device (i.e., a trackball can be rolled infinitely in any direction) and a location on the display, a pointer can be displayed on the screen to reflect the current position of the user on the screen. Such motion by a user may also occur without a pointer being displayed, but instead with objects on the display being highlighted individually as the user manipulates the pointing device. For example, when a user initially opens a desktop covered in icons, one of the icons can be highlighted, such as by displaying it in a brighter manner than other icons, displaying it in an inverse coloring, or drawing a bright line around the periphery of the icon (e.g., showing a light-colored square around the icon). Such an indication can show that the particular icon is currently the active icon, and that the icon can be selected, or that actions specified by the user will be performed on that icon or the application or other object that is represented by the icon. As the user moves the pointing device, the highlighting can jump or snap from one object to the next object in the direction of the user's movement, so that when the presumed location of the user on the display as they move a pointing device passes a midpoint between the two icons, the highlighting disappears from the first object and appears on the second object.

Also, a user may then click on a selection button that corresponds to the pointing device so as to select an object on the screen. The user can subsequently move the pointing device to move the pointer across multiple objects, such as icons on a desktop so as to move the originally selected object to a new location or to select across the multiple objects. In the latter circumstance, the selected objects can each in turn be highlighted such as in the manners discussed above, to indicate that they are now the focus of the device.

The interface may change if the user takes their finger off the pointing device and moves it to the surface of the touch screen (which is not a pointing device as that term is used here). In such a situation, there will not be a need for an pointer on the display to indicate where the user is currently located, because the user's fingertip will necessarily be at that location. As a result, when the user first contacts the screen, the pointer, if it was previously displayed, may be removed from the display. Also, any selected icons can, in appropriate circumstances, become un-highlighted, and removed from a list of items that will be affected by a current user action on the device. Such un-highlighting of the objects may also wait until the user contacts the surface of the screen and also moves a predetermined amount on the screen (to indicate, e.g., that the user may want to perform a different selection action on the device). In addition, the un-highlighting may not occur if the user selects a particular area of the screen. For example, a certain area of the screen may contain buttons whose selection causes an action to be performed, while another area may include selectable icons or other objects. A user could thus use a pointing device to select objects in the latter area, and follow up by selecting on the touch screen one of the buttons in the former area—without having the objects become unselected.

In addition, tactile feedback may be provided to the user, such as by the device 200 shaking slightly when the icon 204 has been selected, and also shaking as the user passes each location in a grid on the desktop. Alternatively, similar tactile feedback may be provided to indicate other events to a user, including so that a user need not have a display or look at the display. Also, audio feedback may be provided for similar purposes, and voice input may be received and translated by the system. The tactile feedback can also occur only when the interface is snapping between objects, such as when the user is employing a pointing device for input, so as to simulate the snapping motion, but may not move when the screen is being used for input.

Referring again to particular objects on the display, a program module 206 takes the form of a familiar clock/date module that sits on the surface of the desktop. The module 206 may be located on the same layer as the area 202 and the icons 203, 204. As a result, the module 206 may be treated at the same hierarchical level by the operating system, as are the other objects, and may displace such objects if it is moved into the area of the objects. In certain instances, although the module 206 appears to be free-floating over the desktop, it may in actuality be snapped into a grid on the desktop. Thus, for example, in this example, the module 206 occupies the space of four grid positions on the desktop. The module 206 may also be dragged by a user to be larger or smaller, and may, as a result, take up more or fewer grid positions. When the module 206 is dragged be larger, adjacent icons may be pushed out of the way and across the desktop.

The middle display shows two relevant changes from the leftmost display. First, the user has changed the form factor of area 202, from a 2×2 arrangement to a 1×3 arrangement. Second, the display shows a selection of icon 204 to combine icon 204 with icon 203 to create a new box or area 210. In particular, when a user long presses on one icon and drags it on top of another icon, the two icons may be grouped together, and a new box or area may be automatically formed around them. In a familiar manner, the new box or area may be given a generic name, and a cursor may be initially placed over that name so that the user may conveniently type in a custom name for that box or area 210. In contrast, where a box or area contains only two icons, and a user drags one of the icons out onto the bare desktop, the box or area may, in certain examples, automatically disintegrate, so that both of the last icons move to the desktop, with the last remaining icon from the box occupying a position on the desktop that is in alignment with its former position in the box or area.

The rightmost display in FIG. 2A shows an example of the movement of an icon into the bottom bar. As noted above, the bottom bar serves as a location to anchor certain icons so that they may be readily accessed from any of the multiple screens across a desktop. In general situations, for example, a user may desire to place frequently accessed searches, documents, or applications in the bar.

The placement of an icon 212 is shown by arrows in the rightmost display. In particular, a user is shown as having long pressed on icon 212 in area 202, and then to have dragged the icon 212 down into the bottom bar and over the top of a pre-existing icon 214. In this manner, the user has indicated an intent to replace icon 214 in the bottom bar, with the icon 212. As a result of this interaction, icon 212 will appear in the third position of the bottom bar, and icon 214 will be moved back to an overall applications area or box on the desktop. Icon 214 may also simply be deleted, in implementations where a copy of the icon is always kept in an applications box, regardless of whether the icon appears elsewhere in the system.

FIG. 2B generally shows the manner in which visual elements on a desktop may be moved and resized, and how such actions affect other elements on the desktop. The particular displays shown here contain similar elements, but are not meant to indicate a progression of displays that result from particular actions by a user.

A contextual actions menu 226 is shown in the figure to provide examples of various actions that may be performed by a user with respect to graphical elements (e.g., program modules and icons) that are part of a desktop. The contextual actions may be inferred by a user, or in certain situations, such as when a user long presses an element, a menu may pop up that is similar to that shown by the contextual actions menu 226 in the figure. For example, the first menu 226 selection in this example is a selection to rename a box. If a user picks that selection, the active cursor may be moved over the title of the box and the user may be allowed to type in a new name for the box. Another menu 226 selection is a "sort by" selection, which permits the user to sort the icons within a box according to their titles, the type of object to which the icon is related, or other such parameters. Yet another selection in the menu 226 is a delete selection whose selection by the user erases the entire box. Upon erasing the box, the icons in the box may be eliminated, or may be moved onto the desktop itself in the space under where they formerly sat in the box. Where the icons are eliminated, copies of the icons may be maintained in a separate applications box that includes all applications available on the device 220.

Various examples in the figure show results from selecting the second menu 226 selection, which is "move & resize." When a user picks this selection, they may be given the option of moving a box and/or resizing the box. Resizing of the box 222 is shown in this example as occurring by use of a handle 224 that appears in a corner of the box after the user picks the menu selection. The user may press and drag on the handle, such as through a touch screen input, to change the size or aspect ratio of the box. For example, in the lower right-hand corner of the figure, a user is shown as changing a 1×3 box into a 2×2 box that has one opening for an icon, and then into a 3×1 box. The user could also then drag the handle to the left to change the 3×1 box into a 2×1 box.

As a second option, the user may choose to move the box 222 rather than resize it. Such movement may occur, in this example, by the user holding down on the title bar of the box 222 and dragging it to another location. Because each of the various objects in this example are on the same layer on the desktop itself, other objects that would normally lie under the box 222 after it has been moved, may be moved and pushed out of the way, and may end up in new locations on the desktop around the box 222. The movement of the other items may occur in a standard fashion, such as by identifying the closest adjacent open grid locations into which the items may be moved. Other adjacent items may also be pushed further away to make room for the items being displaced by the moved box. Also, where the box and the displaced items are of the same size, the locations for the box and the displaced items may simply be swapped.

FIGS. 2C and 2D show, schematically, techniques for panning across a desktop space. FIG. 2C shows panning in portrait mode, while FIG. 2D shows panning in landscape mode. In general, a single wallpaper image is provided for a device 240, whether the device is in landscape mode or portrait mode. The wallpaper, or a portion of the wallpaper, may then be divided into multiple screen spaces, which may be exclusive of each other or, in these examples, may be overlapping screen spaces. In particular, these displays provided by the device may appear to the user as if the device is a window onto the desktop, where the window may be moved back and forth over the desktop and new portions of the background and new icons on the desktop may appear as such panning occurs.

Referring more specifically to FIG. 2C, an example wallpaper having a first dimension 242, and a second dimension 243 is shown schematically. In one example, the first dimension 242 may be 640 pixels, and the second dimension 243 may be 480 pixels. Below the wallpaper is shown schematically three different screen spaces for a portrait mode presentation of the wallpaper. A first screen space 242a shows the leftmost portion of the wallpaper, and is half the width of the wallpaper. The second screen space 242b is the central half of the wallpaper, and a third screen space 242c shows the right half of the wallpaper. As shown by device schematic 244, a user may press on the desktop, such as on an unoccupied area of the desktop where the wallpaper shows through any icons on the desktop, to drag the display right or left.

The scrolling or panning of the wallpaper relative to icons or other objects on the desktop may occur in a parallax manner. In particular, the wallpaper may be moved in a manner so that a larger portion of the wallpaper shows in any given display compared to the desktop objects. For example, the ratio of the wallpaper displayed on any screen may be ½ while the ratio of the items on the desktop that are displayed may be ⅓. In this manner, the wallpaper will pan a shorter distance in terms of pixels for any given panning motion by the user, compared to the panning of the other desktop objects.

As a result, the viewer may be provided with a three-dimensional effect between the motion of the objects on the desktop and the motion of the wallpaper, so that the objects appear to float in space closer to the user, and the wallpaper appears to be more distant from the user. Such a parallax effect may be known to a user from an entirely different context such as video games, in the 1980s video game Moon Patrol, where the lunar rover in the foreground and landscaping in the foreground appear to pan at a rate that is different than mountains in the background.

In FIG. 2D, the wallpaper has a first dimension 252 (which may again be 640 pixels), and has a second dimension 256 that differs from the corresponding second dimension 254 of the display. In other words, the bottom portion of an image that generates the wallpaper will be cut off from view in landscape mode. In certain circumstances, the image could also be compressed, or displayed in other manners. In this way, a single common image can be used for both modes of presentation.

And in this example, each of the screen spaces 252a-252c take up a larger portion of the entire displayable area. Again, however, as shown by action 260 on device 258, movement from one screen space to the next may be achieved by pressing on the background and dragging. Similar motion can be achieved using pointer inputs such as trackballs or d-pads.

Panning from one screen space to the next can also be achieved while dragging an interface element such as an icon. For example, if a user touches an icon and holds down on it, the user may drag it to the edge of the screen, and the background may automatically pan over to the next screen space, either immediately or after a slight delay that is designed to prevent accidental panning. Also, as mentioned, the adjacent screen spaces may be overlapping (as shown in the figures) or non-overlapping. Overlapping screen spaces may provide the user with better visual continuity, while non-overlapping screen spaces may permit a user to pan more quickly across a space.

Figure 3:
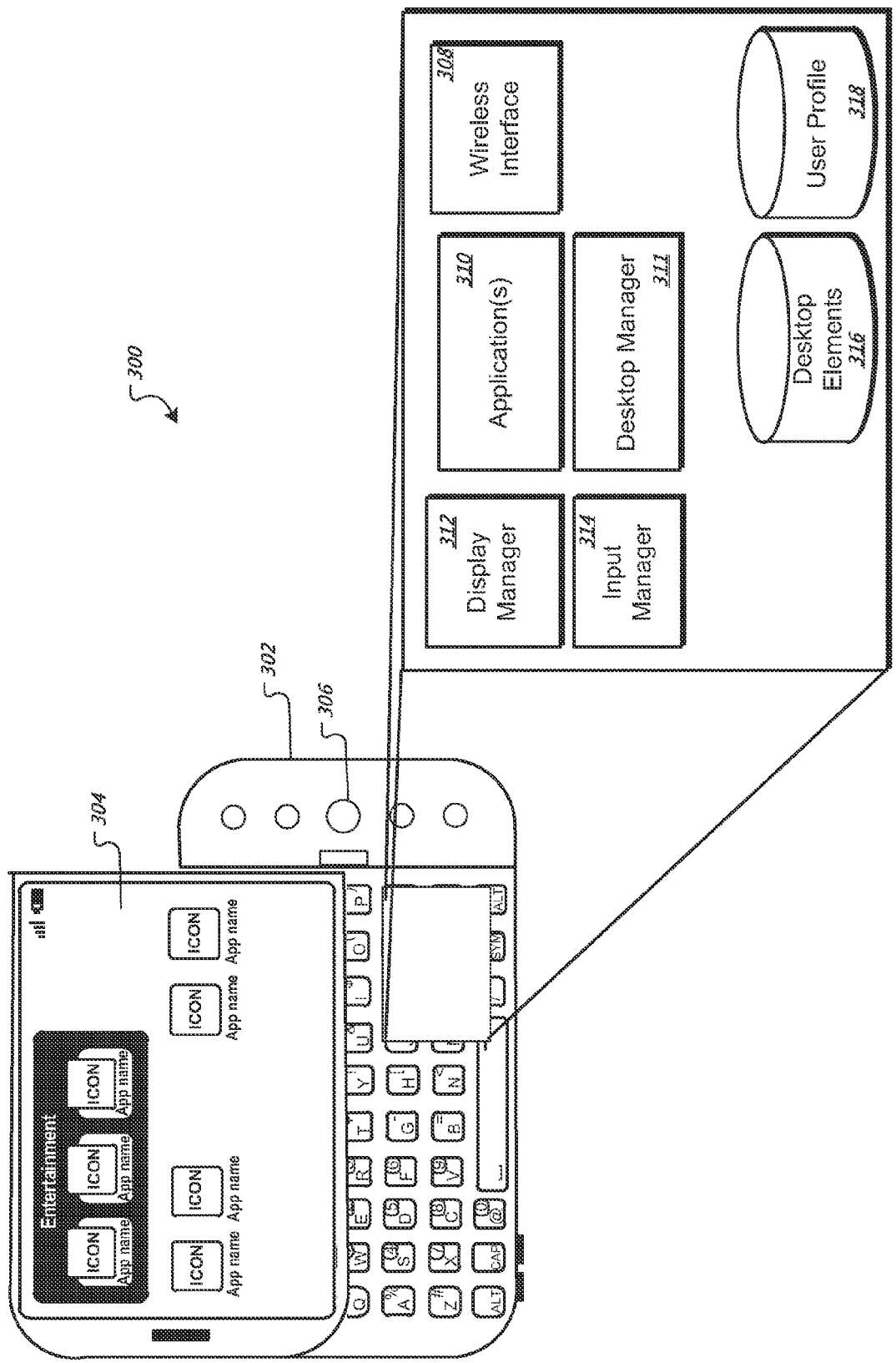
FIG. 3 is a schematic diagram of a system that provides user interaction in response to touch screen inputs.

FIG. 3 is a schematic diagram of a system 300 that provides user interaction in response to touch screen inputs. The system 300 may be implemented using a mobile device such as device 302. The device 302 includes various input and output mechanisms such as a touch screen display 304 and a roller ball 306. A number of components within device 302 may be configured to provide various selection functionality on display 304, such as the functionality for organizing a desktop discussed above. In addition, the device 302 may be provided with an operating system, such as the ANDROID operating system, that may provide one or more of the structural components described here.

One such component is a display manager 312, which may be responsible for rendering content for presentation on display 304. The display manager 312 may receive graphic-related content from a number of sources and may determine how the content is to be provided to a user. For example, a number of different windows or similar graphical elements for various applications 310 on the device 302 may need to be displayed, and the display manager 312 may determine which to display, which to hide, and what to display or hide when there is overlap between various graphical objects.

An input manager 314 may be responsible for translating commands provided by a user of device 302. For example, such commands may come from a keyboard, from touch screen display 304, from trackball 306, or from other such sources, including dedicated buttons or soft buttons (e.g., buttons whose functions may change over time, and whose functions may be displayed on areas of display 304 that are adjacent to the particular buttons). The input manager 314 may determine, for example, in what area of the display commands are being received, and thus in what application being shown on the display the commands are intended for. In addition, it may interpret input motions on the touch screen 304 into a common format and may pass those interpreted motions (e.g., short press, long press, multiple press, and straight-line drags) to the appropriate application or to portions of the operating system. The input manager 314 may also report such inputs to an event manager (not shown) that in turn reports them to the appropriate modules or applications.

The input manager 314 may cooperate with the display manager 312 in various manners, such as to change the displays on the touch screen 304 when a user moves from providing input via a pointing device like a trackball to the touch screen itself, or vice versa. As discussed above, input via a pointing device may involve showing a pointer on the touch screen 304 to indicate where the user is located, and the pointer can be removed when contact or motion is sensed on the touch screen. In like manner, objects that have been highlighted as selected objects when a user is employing one input mechanism can be unhighlighted when the user switches to the other input mechanism (where the input mechanisms are a pointing device and the touch screen, or vice-versa). Such un-highlighting can also occur only in certain situations like those discussed above.

A desktop manager 311 may be responsible for managing user interactions with elements shown to a user on a desktop interface. For example, the desktop manager 311 may store indicators for each element on a single layer of the desktop and coordinate the positioning of such items. Also, the desktop manager 311 may receive alerts when a user selects an item, and may notify the appropriate application (and pass appropriate parameters to the application). For example, if a user selects a persistent search icon, the desktop manager 311 may gather a search string associated with the icon, may launch a web browser or independent search application, and may submit the search string to the browser or search application in the appropriate form to get a remote search engine to return search results to the device 300.

A variety of applications 310 may operate, generally on a common microprocessor, on the device 302. The applications 310 may take a variety of forms, such as mapping applications, e-mail and other messaging applications, search applications, web browser applications, and various applications running within a web browser or running extensions of a web browser. The applications may also define user interface behavior like that described above, for when a user shifts from one input mechanism to another, or the actions may be defined by a library that can be accessed by the applications.

A wireless interface 308 managers communication with a wireless network, which may be a data network that also carries voice communications. The wireless interface may operate in a familiar manner, such as according to the examples discussed below, and may provide for communication by the device 302 with messaging service such as text messaging, e-mail, and telephone voice mail messaging. In addition, the wireless interface 308 may support downloads and uploads of content and computer code over a wireless network.

Various forms of persistent storage may be provided, such as using fixed disk drives and/or solid state memory devices. Two examples are shown here. First, desktop elements storage 316 includes data representing objects associated with the desktop. For example, the desktop elements storage 316 may contain or refer to image files for icon graphics and text files for icon and box names. Also, a URI may be associated with each desktop icon so that selection of the icon calls the URI, and functionality contained at the URI can be performed by the operating system. The organization of such referencing may occur in manners like those described in co-pending U.S. Provisional Patent Application Ser. No. 60/987,324, which is herein incorporated by reference in its entirety. The desktop elements storage 316 may also include information about the wallpaper for a user and the general positioning and layout of items on the desktop, in addition to indicators of which applications are currently active on the system or were active when the system was last shut down.

Separately, a user profile storage 318, which may be stored on the same media as desktop elements storage 316. The user profile 318 includes various parameters about a user of the device 302. In the example relevant here, the user profile may include data defining a theme for display on the device 302 and other setting peculiar to the user.

Figure 4A:
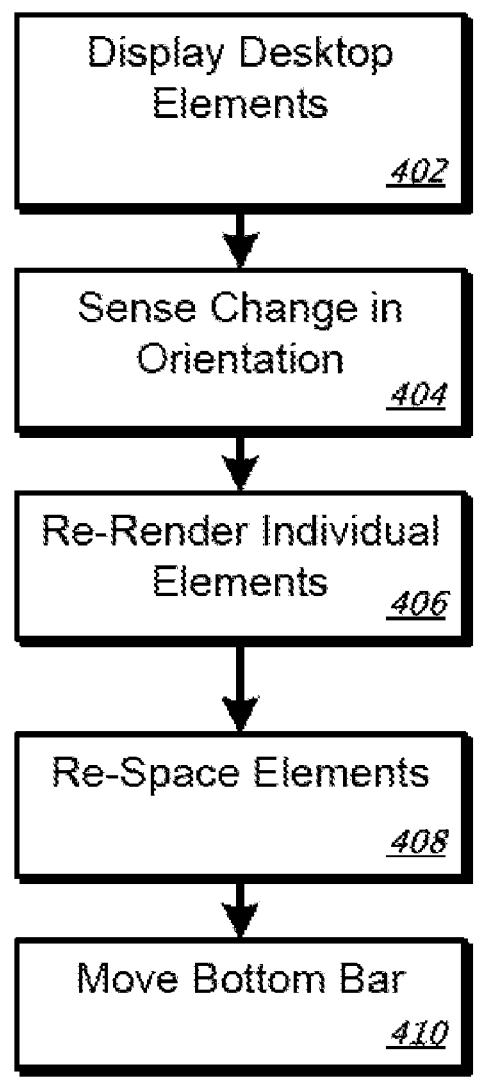
FIGS. 4A-4D are flow charts of example processes for interacting with graphical elements on a computer desktop.
Figure 4B:
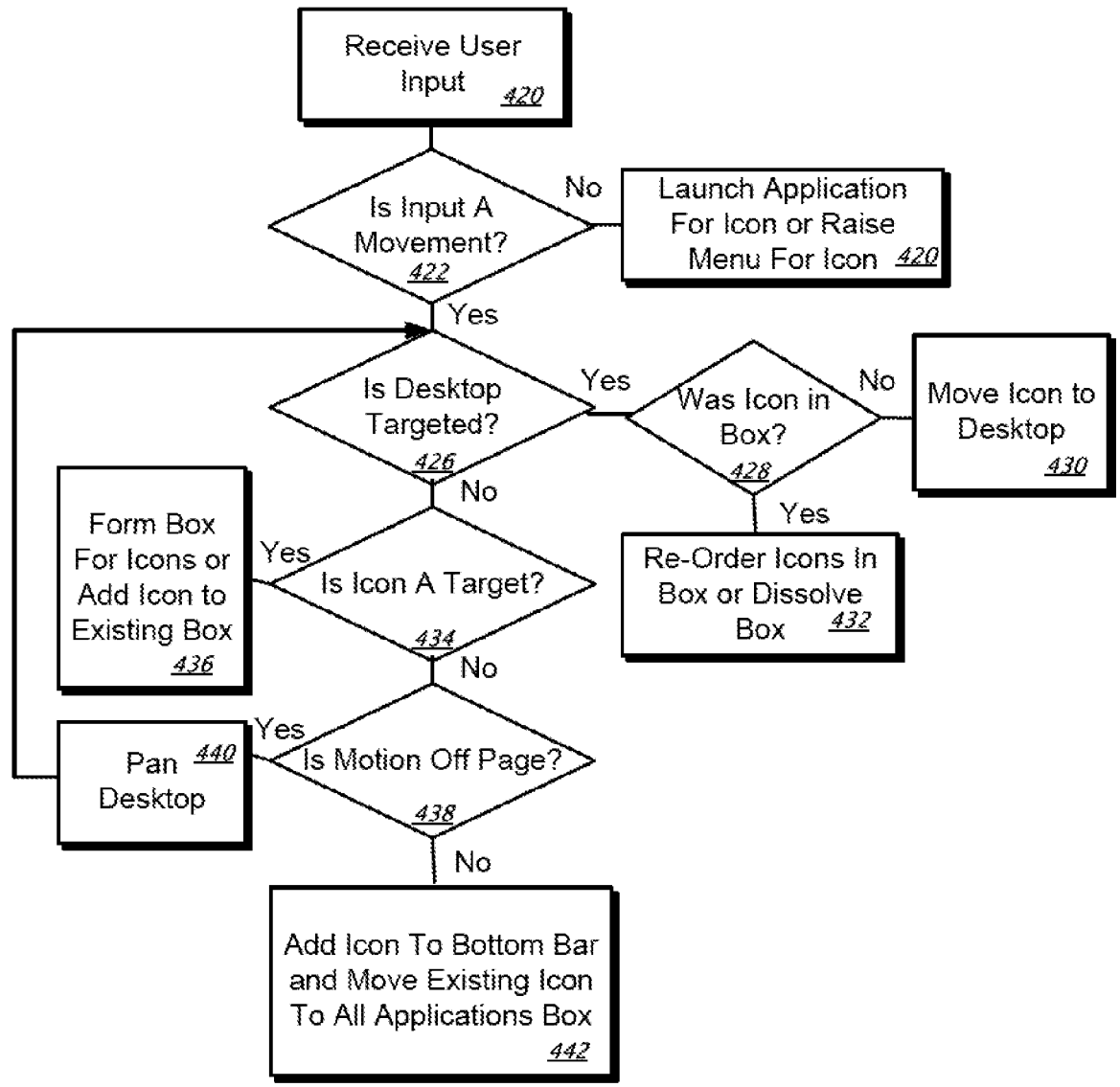
Figure 4C:
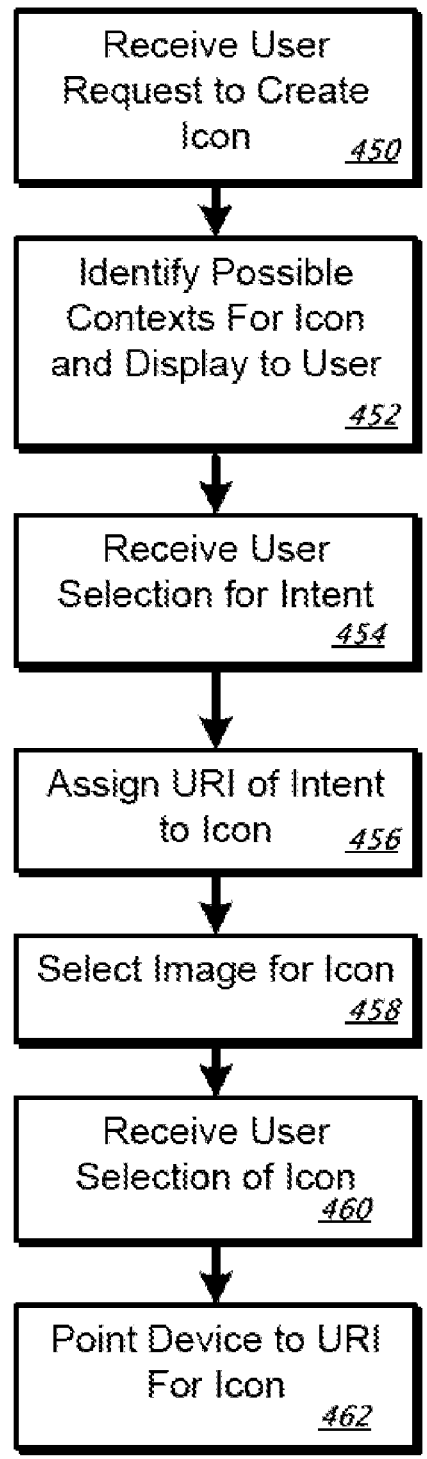

FIGS. 4A-4C are flow charts of example processes for interacting with graphical elements on a computer desktop. In general, FIG. 4A shows a process for rendering a desktop when the presentation mode of the a device changes, e.g., from portrait to landscape or vice-versa. FIG. 4B generally shows a process for responding to user movement of graphical elements on a desktop, and FIG. 4C generally shows a process for responding to a user selection of a desktop icon.

Referring now more specifically to FIG. 4A, the example process begins at box 402, where a mobile device displays various desktop graphical elements, such as icons, the output of program modules running on the desktop, and boxes or folders (see FIG. 1A). In box 404, a change in orientation of the device is sensed. Such a change in orientation may occur by a number of known mechanisms, such as by sensing an opening of a slider phone, and determining that such opening indicates an intent to type on a keyboard in a landscape mode.

Also, accelerometers or other motion sensors may be used to determine in orientation of the device. At box 406, individual elements are re-rendered for the device, and at box 408, the elements are re-spaced on the device. In particular, title bars of icon may be made wider in landscape mode so that additional text may fit on each title bar, or on each line of each title bar. Also, in certain implementations, the aspect ratio of each icon may be changed if appropriate, such as by narrowing an icon in the dimension of the display that is currently shortest. In other words, an icon may be made thinner when shown in portrait mode, and shorter or squatter when shown in landscape mode. Re-spacing seeing of the icons and repositioning of the icons may occur according to mechanisms such as those shown in FIG. 2E, so that the general arrangement of the icons and boxes holding icons on the desktop is maintained between the landscape mode and the portrait mode. In this manner, a user may readily recognize the relative positioning of their icons very quickly after they switch modes on their device.

At box 410, the bottom bar of the display is moved. For example, the bottom bar may be moved from the bottom of the display in portrait mode to the side of the display in landscape mode. The bottom bar may in general be a docking bar for icons, where the icons are displayed across multiple different screen spaces on the desktop. Generally, a user will place frequently accessed applications or other objects in the bar so that they are more readily available to the user, without the user having to pick through multiple icons in a box, or pan across a desktop looking for the icons.

Referring now more specifically to FIG. 4B, there is shown a process for reacting to user movements of elements on a computer desktop. The process begins at box 420, where a user input is received from a user. The user input may include, for example, a tap on an icon, a long press on an icon, and/or a dragging of an icon or flicking of an icon, among other things. At box 422, the process determines whether the input is a movement, such as a dragging or flicking movement. If the input is not a movement, then an application for the icon may be launched or other actions defined at a URI associated with the icon may be performed, such as if the icon input is a clicking or double-clicking input, or a contextual menu for the icon may be raised, such as if the icon input is a long press on the icon.

If the input is a movement, then the process may determine whether the desktop was a target of the movement, or in other words whether the movement ended on the desktop itself rather than on top of an icon or on some other element that may be next to or on top of the desktop. If the desktop was targeted by the movement (box 426), the process may then determine whether the an icon that has been moved by the movement was initially in a box on the desktop (box 428). If the icon was not in a box, a process may simply move the icon to the desktop (box 430). For example, the user may have simply picked up an icon on the desktop and moved it to a different area on the desktop. Alternatively, the user may have picked up on icon from a bottom bar or similar mechanism and moved it onto the desktop. In such a situation, the icon may be removed from the bottom bar or from the prior location on the desktop and placed in the location where the user dropped it.

If the icon was in a box previously, then the process may reorder the icons that are remaining in the box if there is still more than one icon in the box, or may dissolve the box in appropriate circumstances, such as when a single icon or no icons remain in the box. The size of the box may also be adjusted so as to leave a minimum amount of empty space inside the box.

If the desktop was not the target of the user's move, the process may determine whether an icon on the desktop was a target of the move (box 434). Such a motion indicates an intent by the user to create a new box that contains the moved icon and the icon that was the target of the movement. Thus, at box 436, the process may form a box for the icons or add the moved icon to an existing box, if the target icon was already in a box. In certain situations, nesting of boxes may also be provided for, so that dragging an icon on top of another icon in a box will create a further box within the first box, where the further box includes the dragged icon and the target icon.

If an icon is not a target, then the target in this example would need to be either an area off the edge of the current screen space, or a bottom bar or similar structure. Thus, at box 438, the process determines whether the motion is off the page and if it is, the process pans the desktop at 440, and then loops back to further determine the ultimate target of the user motion. If the motion was not off the page, then the process may add the icon to the bottom bar in the location at which the user dropped the item and may move any icon that might have already been in that location on the bottom bar to an applications box or may simply delete the icon, as shown at box 442.

Referring now more specifically to FIG. 4C, there is shown a process for executing an application or other item represented by an icon (e.g., in the form of a short-cut) on a computer desktop. As discussed above, each icon may simply be associated with a URI, and the target of the URI may be a list of code or fields describing what an author of the code would like performed by the device. One example of such code may be an ANDROID class known as an intent. The various actions associated with an intent may take a wide variety of forms so that icons on a desktop may perform a wide range of tasks.

At the initiation of this example process, the icon does not yet exist, so at box 450, the process receives a user request to create a desktop icon. Such a request may be received via a user providing a long press input to a background area of a desktop. The process may respond by identifying a number of standard contexts for such an icon, and may generate a pop-up menu over the background to display the contexts to the user. Some example contexts include icons that: launch a musical or video playlist (or perhaps more simply a single musical file), submit a predefined search engine query (e.g., news about Joe Blow in the last week), bring up a list of web bookmarks of a particular type or a web page or group of pages in multiple different tabs in a browser, opens a particular e-mail folder or a list of e-mail messages that match a predefined search string, raises a mini-application for showing a contact or contacts from a user's contacts list, or other similar functions.

The user may then select one of the provided contexts to indicate the type of function they want performed when the icon is later selected (box 454). They may also then be prompted to enter certain context-specific parameters for the icon. For example, if the user chooses a persistent search, they may be asked to enter the search string. If the selection is to play music, the user may be asked to select a particular song or playlist. If the selection is to launch a particular application, they may be asked for scripting code to be provided to the application when it launches.

After the user has finished registering their intent, the icon may be created and assigned a URI (box 456). The URI may, for example, point to a particular playlist that is registered with the operating system. The parameters provided by the user at box 454 may also be stored at the URI and accessed by the operating system when a user sects an associated icon. In certain instances, all objects in a system may be assigned a URI, so as to make pointing by icons to URIs a relatively simple task. An image for the icon may then be selected, either automatically (e.g., according to the type of URI to which the icon points) or by manual selection of the user (box 458).

At some later time, a user may select the icon (box 460). Such selection may cause the URI to be provided to the operating system, and the application, file, code, or fields, at the URI to be executed (e.g., by effectively pointing the device to the URI, box 462). The user may then experience the functionality associated with the URI.

Figure 4D:
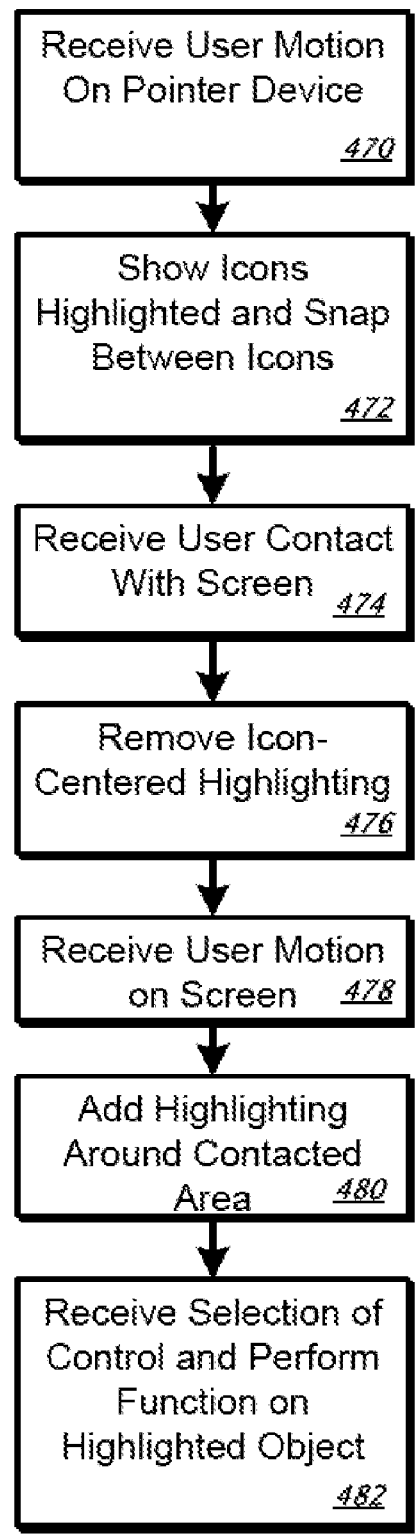

FIG. 4D is a flow chart of a process for reacting to input from two different input mechanisms on a computing device. In general, the process involves changing the display of certain visual elements on a touch screen display when a user moves from providing input from a pointing device to providing input on the touch screen itself.

The process begins at box 470 where user input is received at a pointer device, such as a joystick, D pad, or trackball. Such motion can occur in various familiar manners. At box 472, the particular motion in this example has occurred across a grid of icons on a computer desktop, so as the user moves the input, different icons are individually highlighted in turn, in the direction of the input motion (e.g., left, right, up, or down). The selections will jump or snap from one icon to the next adjacent icon. Also, a user selection may occur via the pointing device (e.g., a click) and multiple icons can be highlighted in that situation.

At box 474, user contact with the touch screen is sensed. Such an event can be reported to an application that is managing the current display, and the application may determine that the contact, if in the right area of the display (e.g., over the icon area), is intended to select icons in a different manner. As a result, at box 476, the process removes the prior highlighting of the icon or icons, that was in place before the contact. If the contact is over an icon, it may be highlighted (or an application corresponding to the icon can be launched immediately without further action by the user), or if the contact is not over an icon, subsequent dragging motion by the user on the touch screen can cause a selection box to be drawn, where drawing a selection box may not have been possible using the pointing device. In the latter situation, selecting a group of icons may instead need to occur by highlighting a first icon, holding down a selection button, and then moving down to a second icon—where the rectangle defined by the two icons at its corners may then have its icons all highlighted (box 480).

Finally, at box 482, a user selection is received and an appropriate operation is performed on the now-highlighted icons or other objects. For example, if the icons represent applications, each of the application can be launched, whereas if the icons represent documents, each of the documents may be raised in its associated application, which may be launched if it is not already running.

Figure 5:
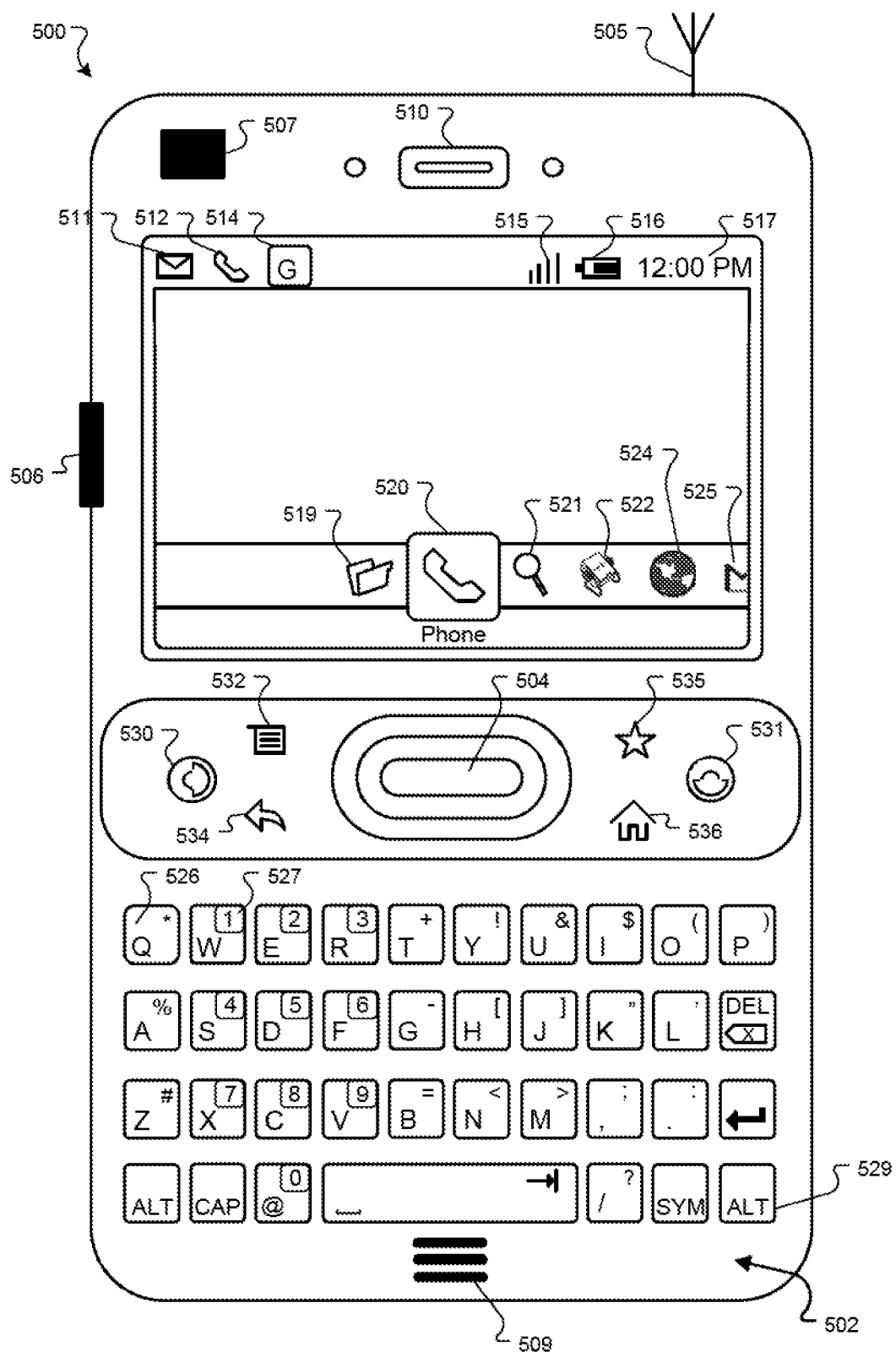
FIG. 5 is a schematic representation of an exemplary mobile device that implements embodiments of the notification techniques described herein.

Referring now to FIG. 5, the exterior appearance of an exemplary device 500 that implements the user interface features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), SGPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540 power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
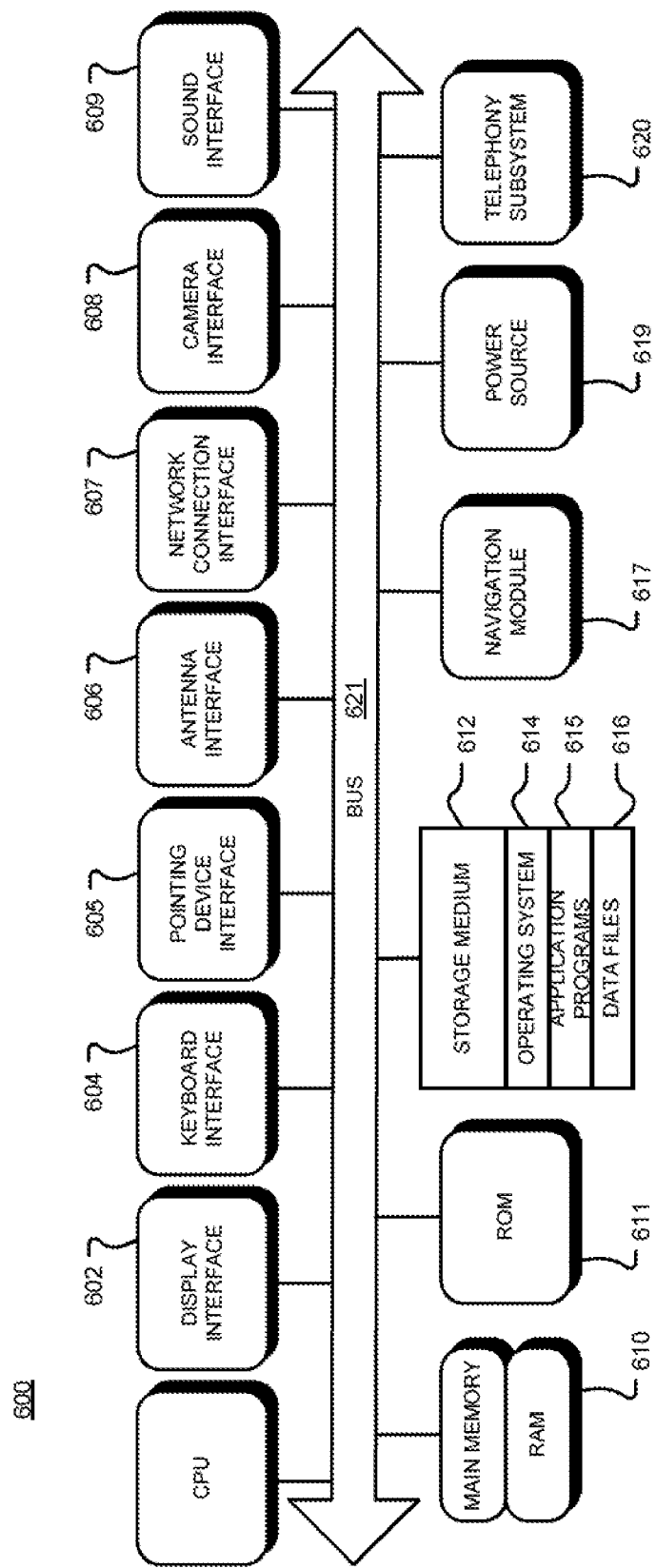
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT.NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the MOZILLA FIREFOX web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
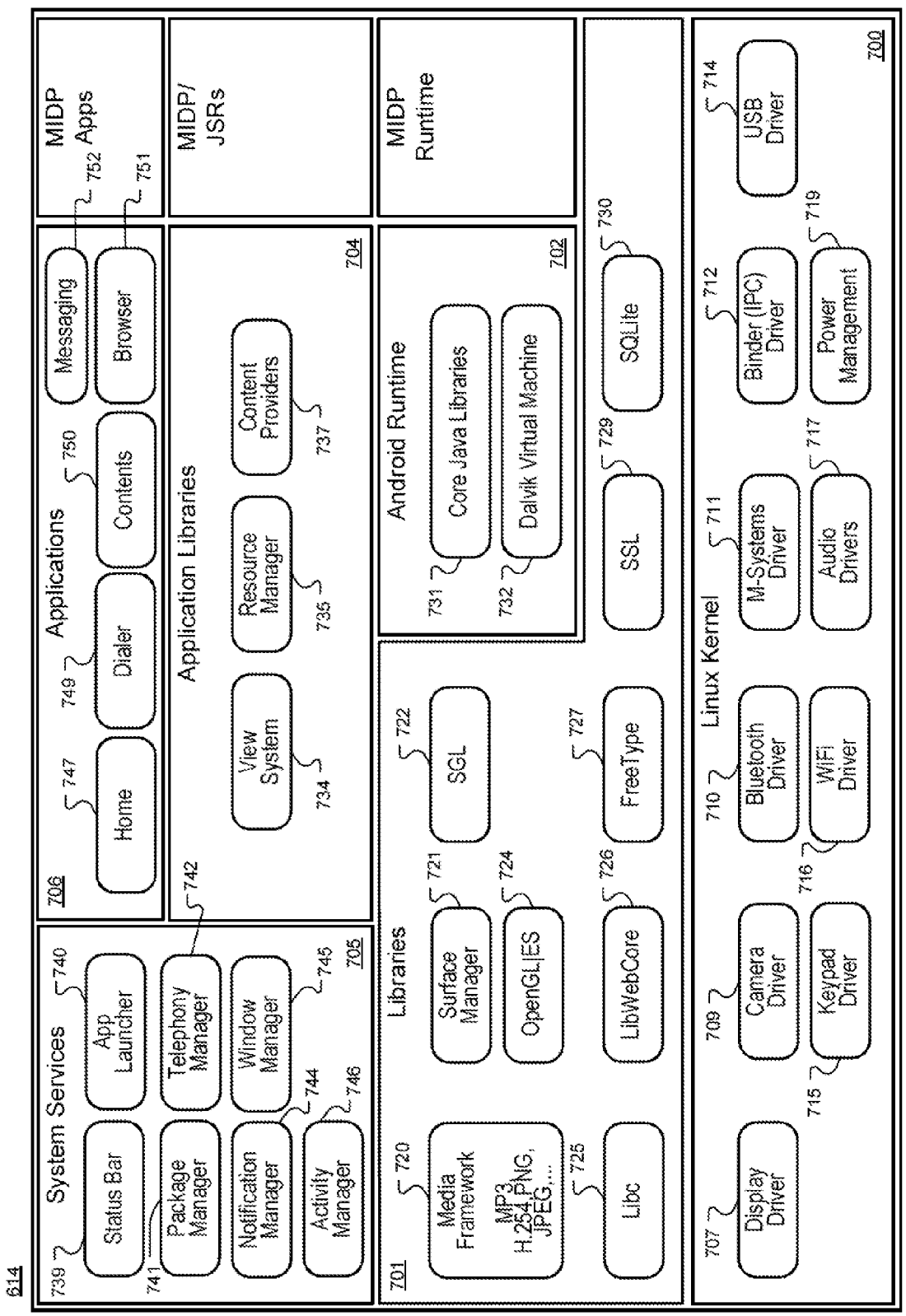
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated byte-codes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
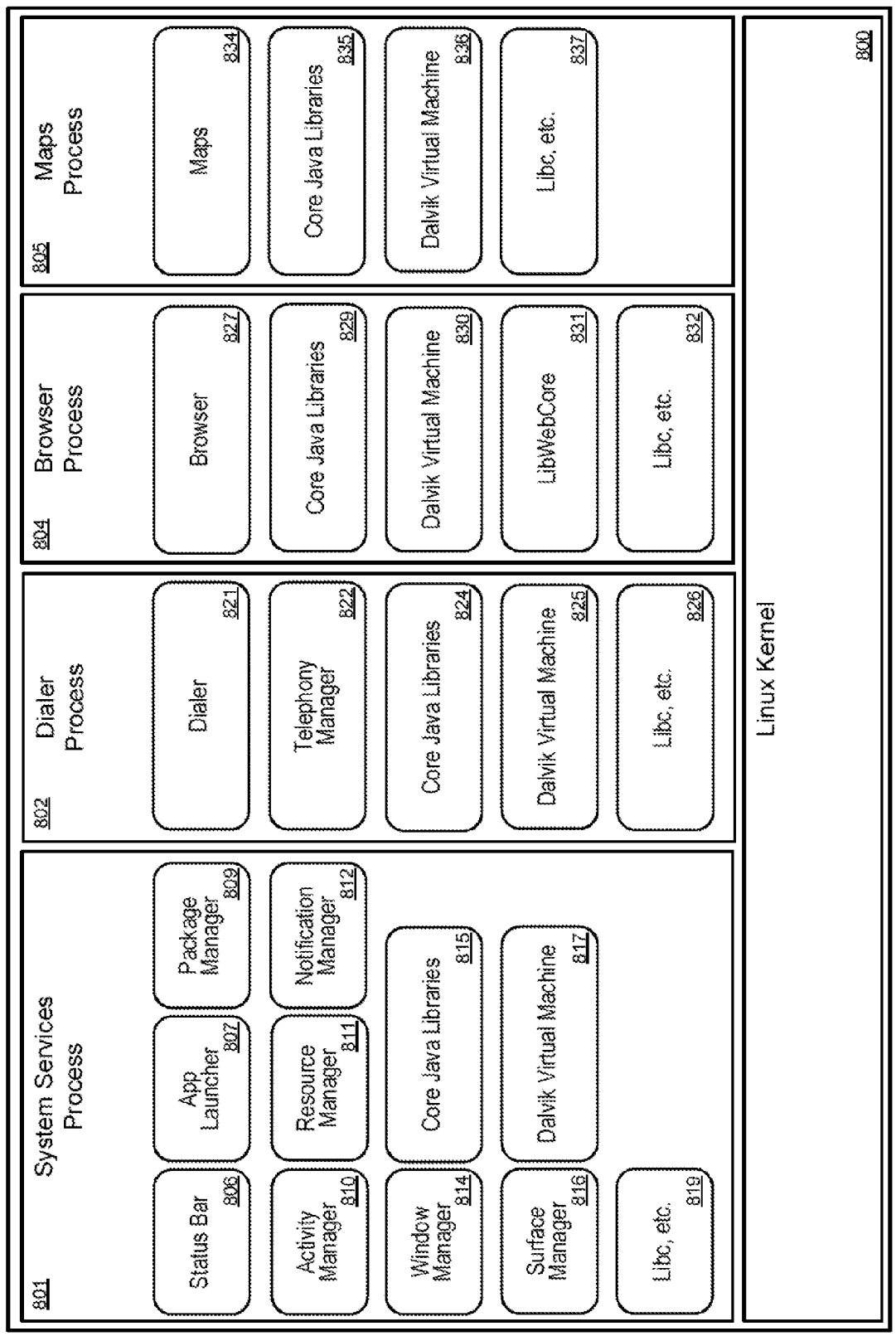
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
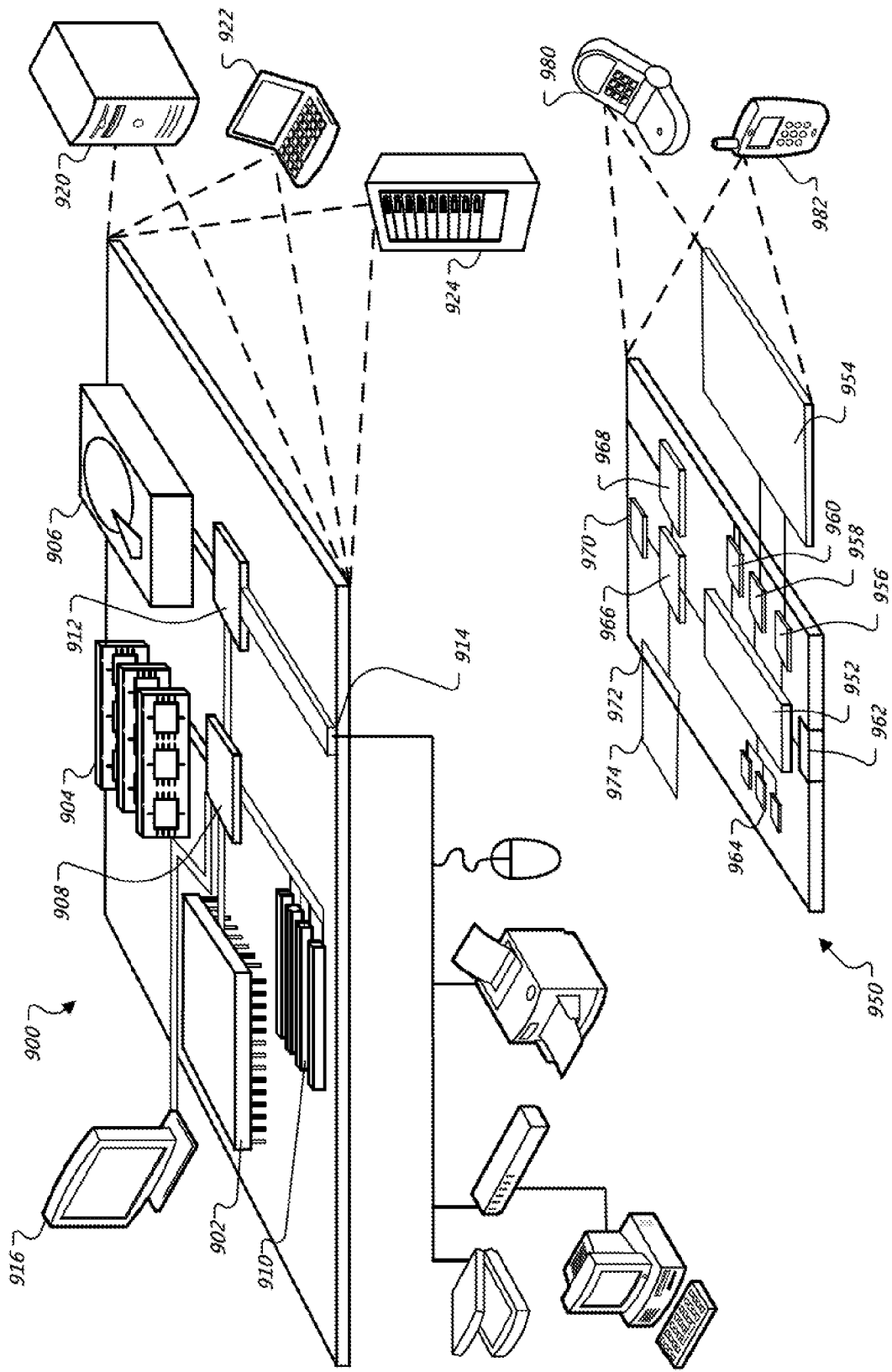
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units.

Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   displaying, on a mobile device proximity sensitive display, a first portion of a mobile device desktop, wherein the mobile device desktop includes a wallpaper image spanning across multiple screens of a mobile device proximity sensitive display and a set of selectable icons that each, when selected causes a predefined action to be performed, and wherein the first portion of the mobile device desktop includes a first portion of the wallpaper image and a first subset of the selectable icons displayed over the first portion of the wallpaper image;

receiving, through the mobile device proximity sensitive display, a user input to pan across the mobile device desktop;

panning the wallpaper image and the selectable icons in a parallax manner relative to each other; and in response to panning the wallpaper image and the selectable icons in a parallax manner relative to each other, displaying, on the mobile device proximity sensitive display, a second portion of the mobile device desktop, wherein the second portion of the mobile device desktop includes a second portion of the wallpaper image and a second subset of the selectable icons displayed over the second portion of the wallpaper image.

2. The method of claim 1, wherein the selectable icons are panned at a rate approximately 150% of the rate at which the wallpaper image is panned.

3. The method of claim 1, further comprising panning to automatically snap points on the mobile device desktop, and displaying the second subset of the selectable icons from a screen that is adjacent to a screen on which the user input to pan is received.

4. The method of claim 1, wherein the user input to pan is received in the form of a finger flick on the mobile device proximity sensitive display.

5. The method of claim 1, wherein the selectable icons pan farther than the wallpaper image in response to a particular user input to pan across the mobile device desktop.

6. The method of claim 1, wherein
the user input comprises a touch input being made laterally across the mobile device proximity sensitive display, and
the wallpaper image and the selectable icons are panned in a same direction as the input made laterally across the mobile device proximity sensitive display.

7. The method of claim 6, further comprising determining whether the user input occurred over one of the selectable icons, or over the wallpaper image in a location where there are no selectable icons.

8. The method of claim 1, wherein
a background space that holds the wallpaper image is a first integer m number of units wide,
a foreground space that holds the selectable icons is a second integer n units wide, with n being different than m, and
at a given time, the mobile device proximity sensitive display shows 1/m portion of the background space and 1/n portion of the foreground space, both before and after panning the wallpaper image and the selectable icons in a parallax manner relative to each other.

9. The method of claim 8, wherein as a result of panning the wallpaper image and the selectable icons in a parallax manner relative to each other, the background space moves 1/m units in a direction of the user input to pan, and the foreground space moves 1/n units in the direction of the user input to pan.

10. The method of claim 1, further comprising receiving an input to rotate a display orientation between landscape and portrait orientation, and in response to receiving the input to rotate the display orientation, changing an orientation of the wallpaper image on the mobile device proximity sensitive display and displaying only a portion of the wallpaper image on the mobile device proximity sensitive display.

11. The method of claim 1, further comprising receiving a user selection of one of the selectable icons, identifying that the selected icon has been dragged to an edge of the mobile device proximity sensitive display, and panning the wallpaper image and selectable icons in a parallax manner relative to each other in response to the identifying.

12. The method of claim 1, wherein the mobile device proximity sensitive display is a touchscreen display.

13. A system comprising:
one or more processors and one or more computer storage media storing instructions that are operable, when executed by the one or more processors, to cause the one or more processors to perform operations comprising:
displaying, on a mobile device proximity sensitive display, a first portion of a mobile device desktop, wherein the mobile device desktop includes a wallpaper image spanning across multiple screens of a mobile device proximity sensitive display and a set of selectable icons that each, when selected causes a predefined action to be performed, and wherein the first portion of the mobile device desktop includes a first portion of the wallpaper image and a first subset of the selectable icons displayed over the first portion of the wallpaper image;

receiving, through the mobile device proximity sensitive display, a user input to pan across the mobile device desktop;

panning the wallpaper image and the selectable icons in a parallax manner relative to each other; and in response to panning the wallpaper image and the selectable icons in a parallax manner relative to each other, displaying, on the mobile device proximity sensitive display, a second portion of the mobile device desktop, wherein the second portion of the mobile device desktop includes a second portion of the wallpaper image and a second subset of the selectable icons displayed over the second portion of the wallpaper image.

14. The system of claim 13, wherein the selectable icons are panned at a rate approximately 150% of the rate at which the wallpaper image is panned.

15. The system of claim 13, wherein the operations further comprise panning to automatically snap points on the mobile device desktop, and displaying the second subset of the selectable icons from a screen that is adjacent to a screen on which the user input to pan is received.

16. The system of claim 13, wherein the user input to pan is received in the form of a finger flick on the mobile device proximity sensitive display.

17. The system of claim 13, wherein the selectable icons pan farther than the wallpaper image in response to a particular user input to pan across the mobile device desktop.

18. The system of claim 13, wherein the user input comprises a touch input being made laterally across the mobile device proximity sensitive display, and the wallpaper image and the selectable icons are panned in a same direction as the input made laterally across the mobile device proximity sensitive display.

19. The system of claim 18, wherein the operations further comprise determining whether the user input occurred over one of the selectable icons, or over the wallpaper image in a location where there are no selectable icons.

20. The system of claim 13, wherein:
a background space that holds the wallpaper image is a first integer m number of units wide,
a foreground space that holds the selectable icons is a second integer n units wide, with n being different than m, and at a given time, the mobile device proximity sensitive display shows 1/m portion of the background space and 1/n portion of the foreground space, both before and after panning the wallpaper image and the selectable icons in a parallax manner relative to each other.

21. The system of claim 20, wherein as a result of panning the wallpaper image and the selectable icons in a parallax manner relative to each other, the background space moves 1/m units in a direction of the user input to pan, and the foreground space moves 1/n units in the direction of the user input to pan.

22. The system of claim 13, wherein the operations further comprise receiving an input to rotate a display orientation between landscape and portrait orientation, and in response to receiving the input to rotate the display orientation, changing an orientation of the wallpaper image on the mobile device and displaying only a portion of the wallpaper image on the mobile device.

23. The system of claim 13, wherein the operations further comprise receiving a user selection of one of the selectable icons, identifying that the selected icon has been dragged to an edge of the mobile device proximity sensitive display of the mobile device, and panning the wallpaper image and selectable icons in a parallax manner relative to each other in response to the identifying.

24. The system of claim 13, wherein the mobile device proximity sensitive display is a touchscreen display.

25. A non-transitory computer-readable medium storing software having stored thereon instructions, which, when executed by one or more computers, cause the one or more computers to perform operations of:
  displaying, on a mobile device proximity sensitive display, a first portion of a mobile device desktop, wherein the mobile device desktop includes a wallpaper image spanning across multiple screens of a mobile device proximity sensitive display and a set of selectable icons that each, when selected causes a predefined action to be performed, and wherein the first portion of the mobile device desktop includes a first portion of the wallpaper image and a first subset of the selectable icons displayed over the first portion of the wallpaper image;
  receiving, through the mobile device proximity sensitive display, a user input to pan across the mobile device desktop;
  panning the wallpaper image and the selectable icons in a parallax manner relative to each other; and
  in response to panning the wallpaper image and the selectable icons in a parallax manner relative to each other, displaying, on the mobile device proximity sensitive display, a second portion of the mobile device desktop, wherein the second portion of the mobile device desktop includes a second portion of the wallpaper image and a second subset of the selectable icons displayed over the second portion of the wallpaper image.

26. The computer-readable medium of claim 25, wherein the selectable icons are panned at a rate approximately 150% of the rate at which the wallpaper image is panned.

27. The computer-readable medium of claim 25, wherein the operations further comprise panning to automatically snap points on the mobile device desktop, and displaying the second subset of the selectable icons from a screen that is adjacent to a screen on which the user input to pan is received.

28. The computer-readable medium of claim 25, wherein the user input to pan is received in the form of a finger flick on the mobile device proximity sensitive display.

29. The computer-readable medium of claim 25, wherein the selectable icons pan farther than the wallpaper image in response to a particular user input to pan across the mobile device desktop.

30. The computer-readable medium of claim 25, wherein the user input comprises a touch input being made laterally across the mobile device proximity sensitive display, and the wallpaper image and the selectable icons are panned in a same direction as the input made laterally across the mobile device proximity sensitive display.

31. The computer-readable medium of claim 30, wherein the operations further comprise determining whether the user input occurred over one of the selectable icons, or over the wallpaper image in a location where there are no selectable icons.

32. The computer-readable medium of claim 25, wherein:
  a background space that holds the wallpaper image is a first integer m number of units wide,
  a foreground space that holds the selectable icons is a second integer n units wide, with n being different than m, and
  at a given time, the mobile device proximity sensitive display shows 1/m portion of the background space and 1/n portion of the foreground space, both before and after panning the wallpaper image and the selectable icons in a parallax manner relative to each other.

33. The computer-readable medium of claim 32, wherein as a result of panning the wallpaper image and the selectable icons in a parallax manner relative to each other, the background space moves 1/m units in a direction of the user input to pan, and the foreground space moves 1/n units in the direction of the user input to pan.

34. The computer-readable medium of claim 25, wherein the operations further comprise receiving an input to rotate a display orientation between landscape and portrait orientation, and in response to receiving the input to rotate the display orientation, changing an orientation of the wallpaper image on the mobile device and displaying only a portion of the wallpaper image on the mobile device.

35. The computer-readable medium of claim 25, wherein the operations further comprise receiving a user selection of one of the selectable icons, identifying that the selected icon has been dragged to an edge of the mobile device proximity sensitive display of the mobile device, and panning the wallpaper image and selectable icons in a parallax manner relative to each other in response to the identifying.

36. The computer-readable medium of claim 25, wherein the mobile device proximity sensitive display is a touchscreen display.

* * * * *

UNITED STATES PATENT AND TRADEMARK OFFICE
CERTIFICATE OF CORRECTION

| | | |
|---|---|---|
| PATENT NO. | : 8,266,550 B1 | Page 1 of 1 |
| APPLICATION NO. | : 12/474238 | |
| DATED | : September 11, 2012 | |
| INVENTOR(S) | : Cleron et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this
Twenty-ninth Day of January, 2013

David J. Kappos
*Director of the United States Patent and Trademark Office*